(12) United States Patent
Lee et al.

(10) Patent No.: US 9,811,200 B2
(45) Date of Patent: Nov. 7, 2017

(54) TOUCH INPUT DEVICE, VEHICLE INCLUDING THE TOUCH INPUT DEVICE, AND METHOD FOR CONTROLLING THE TOUCH INPUT DEVICE

(71) Applicant: Hyundai Motor Company, Seoul (KR)

(72) Inventors: Jeong-Eom Lee, Gyeonggi-do (KR); Jungsang Min, Seoul (KR); Gi Beom Hong, Gyeonggi-do (KR); Sihyun Joo, Seoul (KR)

(73) Assignee: Hyundai Motor Company, Seoul (KR)

( * ) Notice: Subject to any disclaimer, the term of this patent is extended or adjusted under 35 U.S.C. 154(b) by 3 days.

(21) Appl. No.: 14/936,933

(22) Filed: Nov. 10, 2015

(65) Prior Publication Data

US 2017/0038891 A1    Feb. 9, 2017

(30) Foreign Application Priority Data

Aug. 4, 2015    (KR) ........................ 10-2015-0109857

(51) Int. Cl.
| | |
|---|---|
| *G06F 3/041* | (2006.01) |
| *G06F 3/0488* | (2013.01) |
| *G06F 3/0484* | (2013.01) |
| *B60T 7/08* | (2006.01) |

(52) U.S. Cl.
CPC ............ *G06F 3/0416* (2013.01); *B60T 7/085* (2013.01); *G06F 3/04845* (2013.01); *G06F 3/04883* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 2010/0315349 A1* | 12/2010 | Choi | ................... G06F 3/0338 345/173 |
| 2013/0015964 A1* | 1/2013 | Muller | .................. H01H 25/06 340/459 |
| 2013/0113726 A1 | 5/2013 | Tovar et al. | |

FOREIGN PATENT DOCUMENTS

| | | |
|---|---|---|
| JP | H11-194872 A | 7/1999 |
| JP | 2006-244041 A | 9/2006 |
| JP | 2007-200732 A | 8/2007 |
| KR | 10-2002-0059829 A | 7/2002 |
| KR | 10-2010-0027660 A | 3/2010 |
| KR | 2014-0138361 A | 12/2014 |

* cited by examiner

*Primary Examiner* — Nicholas Lee
(74) *Attorney, Agent, or Firm* — Mintz Levin Cohn Ferris Glovsky and Popeo, P.C.; Peter F. Corless

(57) ABSTRACT

A touch input device includes: a protrusion unit that protrudes from a mounting surface, includes an outer surface portion provided on an outer surface of the protrusion unit, and is configured to receive a touch input; and a recessed unit formed inside the protrusion unit. The outer surface portion is configured to receive a touch input in a protrusion direction of the protrusion unit and in an opposite direction to the protrusion direction of the protrusion unit.

25 Claims, 26 Drawing Sheets

TOUCH INPUT DEVICE, VEHICLE INCLUDING THE TOUCH INPUT DEVICE, AND METHOD FOR CONTROLLING THE TOUCH INPUT DEVICE

CROSS-REFERENCE TO RELATED APPLICATION

This application claims the benefit of and priority to Korean Patent Application No. 10-2015-0109857, filed on Aug. 4, 2015 in the Korean Intellectual Property Office, the disclosure of which is incorporated herein by reference.

BACKGROUND

1. Technical Field

Embodiments of the present disclosure relate generally to a touch input device configured to allow a user to input a touch signal, a vehicle including the touch input device, and a method for controlling the touch input device.

2. Description of Related Art

In general, various electronic devices are enabled to perform electronic communication, and there is a tendency that design together with convenience of operation is emphasized in such electronic devices. In accordance with this tendency, input devices, which are often represented by a key board or a key pad, may be diversified.

A touch input device, for instance, is typically an interface between communication equipment and a user and allows the user to directly touch a touch screen using an input tool such as a finger or a touch pen. Since the touch input device is easily used by all types of users, the touch input device may be used in various devices, such as an Automated Teller Machine (ATM), Personal Digital Assistant (PDA), and mobile phone, as well as in various field, such as banks, government offices, tourism and traffic guidance. In recent years, there has been an effort to apply the touch input device to additional fields, such as health- and medicine and vehicles. The touch input device may be implemented in a touch screen or may be used separately from the display device, and thus, utilization of the touch input device may be increased.

SUMMARY

Therefore, it is an aspect of the present disclosure to provide a touch input device configured to allow a user to input a touch signal to the touch input device having a protruding shape using a touch input in a protrusion direction and an opposite direction to the protrusion direction of the touch input device, a vehicle including the touch input device, and a method for controlling the touch input device.

Additional aspects of the present disclosure will be set forth in part in the description which follows and, in part, will be evident from the description, or may be learned by practice of the present disclosure.

In accordance with embodiments of the present disclosure, a touch input device includes: a protrusion unit that protrudes from a mounting surface, includes an outer surface portion provided on an outer surface of the protrusion unit, and is configured to receive a touch input; and a recessed unit formed inside the protrusion unit. The outer surface portion is configured to receive a touch input in a protrusion direction of the protrusion unit and in an opposite direction to the protrusion direction of the protrusion unit.

The protrusion unit may be formed in a cylindrical-like shape or a truncated cone-like shape.

The touch input device may further include a controller configured recognize a touch input signal received at the outer surface portion, analyze the recognized touch input signal, and provide a command to another device based on the analyzed touch input signal.

The controller may be further configured to turn on a display device when a gesture is input in the opposite direction and turn off the display device when a gesture is input in the protrusion direction.

The controller may be further configured to control the display device so that the display device outputs a pre-determined screen when a gesture is input in the opposite direction.

The controller may be further configured to control the display device so that the display device outputs a pre-determined screen when a gesture is input in the protrusion direction.

The controller may be further configured to zoom in on a screen output by the display device when a gesture is input in the opposite direction and zoom out from the screen output by the display device when a gesture is input in the protrusion direction.

The outer surface portion may be further configured to receive multi-touch input.

The touch input device may further include a controller configured to recognize a multi-touch input signal received at the outer surface portion, analyze the recognized multi-touch input signal, and provide a command to another device based on the analyzed multi-touch input signal.

The outer surface portion may be formed by an inclined surface or a curved surface having a negative curvature.

Furthermore, according to embodiments of the present disclosure, a vehicle includes: a touch input device including: a protrusion unit that protrudes from a mounting surface, includes an outer surface portion provided on an outer surface of the protrusion unit, and is configured to receive a touch input, and a recessed unit formed inside the protrusion unit. The outer surface portion is configured to receive a touch input in a protrusion direction of the protrusion unit and in an opposite direction to the protrusion direction of the protrusion unit.

The vehicle may further include a display device that is operated by a touch input signal received at the touch input device.

The display device may be turned on when a gesture is input in the opposite direction and is turned off when a gesture is input in the protrusion direction.

The display device may output a pre-determined screen when a gesture is input in the opposite direction.

The display device may output a pre-determined screen when a gesture is input in the protrusion direction.

The display device may zoom on a screen when a gesture is input in the opposite direction and zoom out from the screen when a gesture is input in the protrusion direction.

The touch input device may be installed between a driver seat and a passenger seat of the vehicle.

The vehicle may further include a controller configured to operate a parking brake based on an inputted gesture in the protrusion direction or in the opposite direction.

The outer surface portion may receive multi-touch input.

The outer surface portion may be formed by an inclined surface or a curved surface having a negative curvature.

Furthermore, according to embodiments of the present disclosure, a touch input device includes a mounting surface; and a protrusion unit that protrudes from a mounting surface, includes an outer surface portion provided on an outer surface of the protrusion unit, and is configured to receive a touch input. The outer surface portion is configured to receive a touch input in a protrusion direction of the protrusion unit and in an opposite direction to the protrusion direction of the protrusion unit.

Furthermore, according to embodiments of the present disclosure, a method of a touch input device including a protrusion unit that protrudes from a mounting surface, includes an outer surface portion provided on an outer surface of the protrusion unit, and is configured to receive a touch input includes: receiving a touch input signal in a protrusion direction of the protrusion unit or in an opposite direction to the protrusion direction of the protrusion unit; displaying a first pre-determined screen when a gesture is input in the opposite direction; and displaying a second pre-determined screen when a gesture is input in the protrusion direction.

The first pre-determined screen or the second pre-determined screen may include a turned-off screen.

The first pre-determined screen may include a zoomed-in screen of a previously displayed screen, and the second pre-determined screen may to include a zoomed-out screen of the previously displayed screen.

The method may further include receiving a multi-touch input signal.

BRIEF DESCRIPTION OF THE DRAWINGS

These and/or other aspects of the disclosure will become apparent and more readily appreciated from the following description of embodiments, taken in conjunction with the accompanying drawings of which:

FIG. 4 is a view of inputting a press, FIG. 5 is a view of inputting swiping, and FIG. 6 is a view of inputting a character;

FIG. 7 is a view of inputting a touch in an opposite direction to a protrusion direction of a protrusion unit, FIG. 8 is a view of inputting a touch in a protrusion direction of a protrusion unit, and FIG. 9 is a view of an exterior of a touch input device including an outer surface portion formed by an inclined surface;

DETAILED DESCRIPTION OF THE EMBODIMENTS

Figure 1:
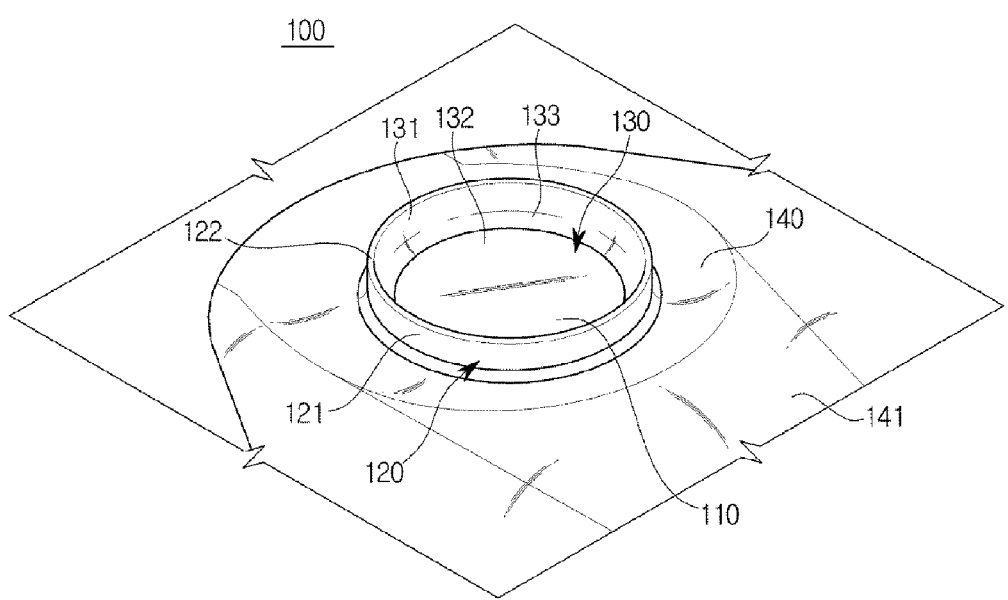
FIG. 1 is a perspective view of a touch input device in accordance with a first embodiment of the present disclosure.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 2:
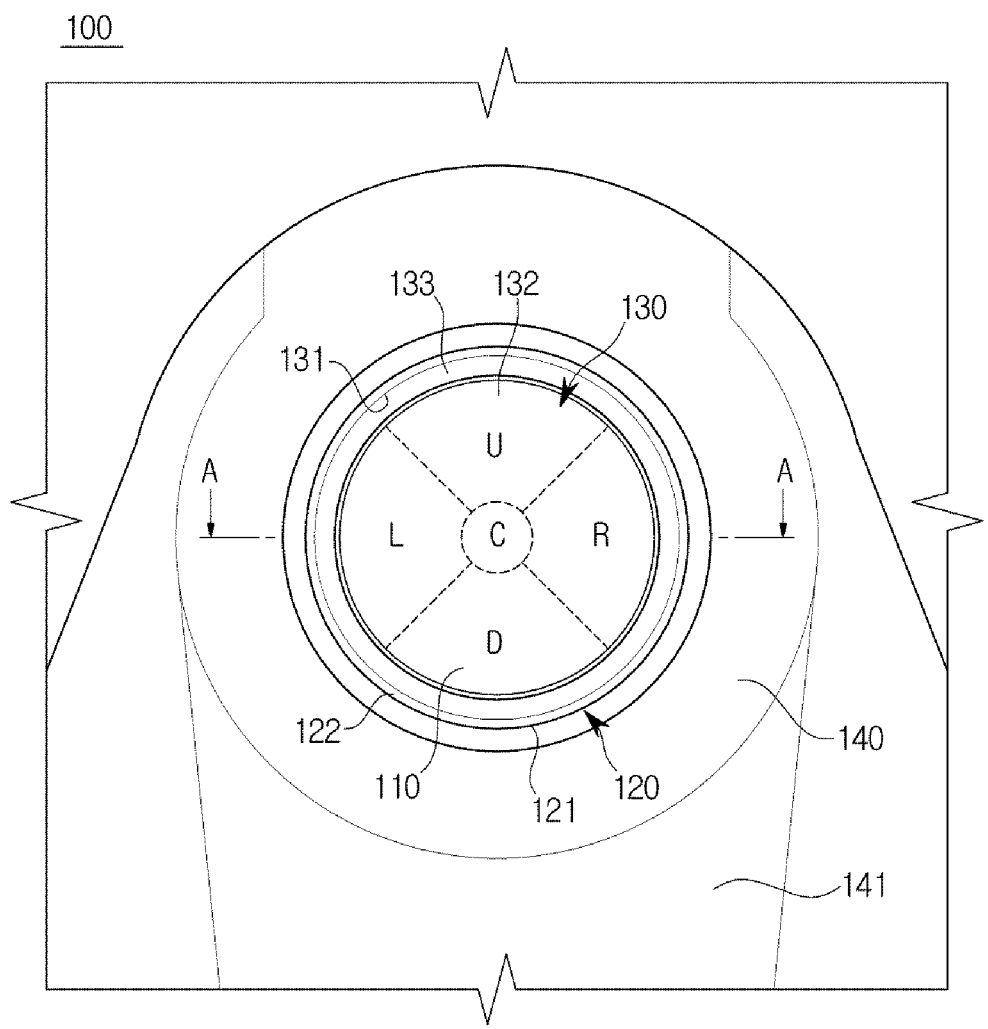
FIG. 2 is a plane view of a touch input device in accordance with a first embodiment of the present disclosure.
Figure 3:
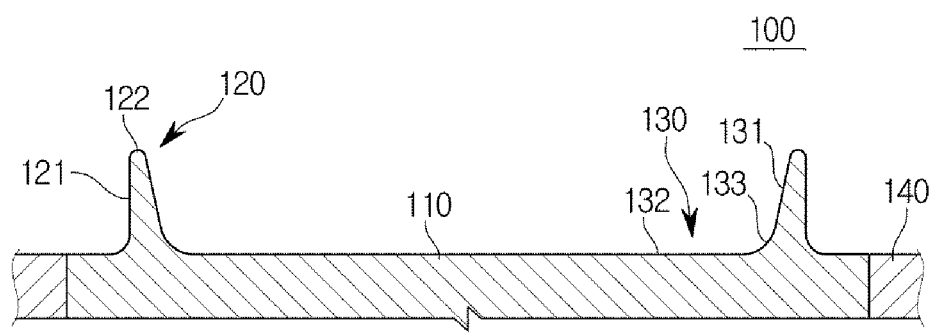
FIG. 3 is a cross-sectional view taken along line A-A' of FIG. 2.

Referring now to the disclosed embodiments, FIG. 1 is a perspective view of a touch input device in accordance with a first embodiment of the present disclosure, FIG. 2 is a plane view of a touch input device in accordance with a first embodiment of the present disclosure and FIG. 3 is a cross-sectional view taken along line A-A' of FIG. 2.

A touch input device 100 according to a first embodiment may include a protrusion unit 120 installed in a mounting surface 140 to be protruded from the mounting surface 140, a recessed unit 130 formed to be recessed inside the protrusion unit 120, and a touch unit 110 provided in the bottom surface of the recessed unit 130. The protrusion unit 120 and the recessed unit 130 may be integrally formed or may be formed as a single structure by being coupled to each other.

The mounting surface 140 may be provided to surround the around of the touch input device 100, and may be formed by a member separated from the touch input device 100. The mounting surface 140 may include a flat surface as a reference surface in which the touch input device 100 is installed, but is not limited thereto. The mounting surface 140 may include a convex surface or a concave surface.

Although not shown in the drawings, an input tool, e.g., a key button or a touch button, surrounding the touch input device 100 may be placed in the mounting surface 140. A user may input a touch signal through the touch input device, or through a button provided in the mounting surface 140 around the touch input device 100.

The protrusion unit 120 may be formed to be protruded from the mounting surface 140. The protrusion unit 120 may include a horizontal section having a circular shape. For example, the protrusion unit 120 may include a cylindrical shape or a truncated cone shape, but is not limited thereto. The shape of the protrusion unit 120 may be modified in various ways, as needed. The protrusion unit 120 may include an outer surface portion 121 connected to the mounting surface 140 and a ridge unit 122 connected to the outer surface portion 121. In the drawings, the outer surface portion 121 having a cylindrical shape and the ridge unit 122 having a ring shape will be described as one example.

The recessed unit 130 may be formed to be recessed from the ridge unit 122 of the protrusion unit 120 toward the inside of the protrusion unit 120. Herein the recessed shape may include a shape of being inclined or having a step as well as a shape of circularly dented. The recessed unit 130 may include an opening in which a horizontal section is a circular shape. For an example, the recessed unit 130 may be circularly opened in the ridge unit 122 of the protrusion unit 120 to be concave toward inside the recessed unit 130.

The recessed unit 130 may include an inner surface portion 131 connected to the ridge unit 122 and a bottom unit 132 in which the touch unit 110 is provided. In the drawings, the inner surface portion 131 having a shape of inner side of cylinder, and the bottom unit 132 having a shape of a circular plane surface will be described as one example. The recessed unit 130 may include a connection unit 133 configured to connect the inner surface portion 131 to the bottom unit 132. For an example, the connection unit 133 may be formed by an inclined surface or a curved surface having a negative curvature. Herein the negative curvature may represent a curvature formed to be concave while viewing from the outside of the recessed unit 130.

The bottom unit 132 may include the touch unit 110. The touch unit 110 may receive a touch input signal from a user.

The touch unit 110 may include a touch pad in which a signal is input when a user touches or closes thereto by using a pointer, such as a finger or a touch pen. The user may input a desired instruction or a command by inputting a pre-determined touch gesture to the touch unit 110. The touch pad may include a touch film, or a touch sheet including a touch sensor. The touch pad may include a touch panel, which is a display device provided with a touchable screen.

Meanwhile, recognizing a position of the pointer in a state in which the pointer is adjacent to the touch pad without touching the touch pad may be referred to as "proximity touch", and recognizing a position of the pointer in a state in which the pointer is contacted to the touch pad may be referred to as "contract touch". A position where proximity touch occurs may be a position vertically corresponding to the pointer with respect to the touch pad when the pointer is close to the touch pad. The touch pad may use resistive technology, optical technology, capacitive technology, ultra-sound technology and pressure technology, but is not limited thereto. A well-known technology may be used for the touch pad.

The mounting surface 140 may further include a wrist supporting member 141 disposed to a lower portion of the gesture input tool to support a user's wrist. The wrist supporting member 141 may be disposed to be higher than the touch unit 110. The wrist may be prevented from being folded over when the user touches the touch unit 110 in a state of supporting the wrist supporting member 141. Accordingly, while preventing user's muscloskeletal disease, more comfortable sense of operation may be provided.

The touch input device 100 may include a controller configured to give a command to various devices by recognizing a touch input signal input through the touch unit 110 and analyzing the touch input signal. The touch input signal may include a tap signal in which a pointer touches a certain position in the touch unit 110 and a gesture signal in which the pointer moves while being in contact with the touch unit 110 (i.e., dragging).

When a pointer makes contact to a divided area of the touch unit 110, the controller may perform a command, which is pre-determined based on the divided area, by recognizing a tap signal.

Referring to FIG. 2, the touch unit 110 may be divided into a center portion and an edge portion. For an example, when the touch unit 110 is provided to be a circular shape, the center portion may be a small circle placed in an inner side, and the edge portion may be a big circle except the center portion. Alternatively, the area of the touch unit 110 may be more subdivided.

The edge portion of the touch unit 110 may be divided into up, down, left, and right. For an example, the area of the touch unit 110 may be divided into 90 degree. Alternatively, the area of the touch unit 110 may be divided into a smaller degree than 90 degree.

As shown in FIG. 2, the circular touch unit 110 may include the center portion (C) provided to be a small circle inside the touch unit 110, and the edge portion (U, D, L, R), and the edge portion (U, D, L, R) may be divided into four portion by 90 degree along with a circumference. For an example, the controller may perform a command to select a menu, in which a cursor is placed, when a pointer taps on the center portion (C), and may perform a command to move a cursor on a screen toward up, down, left and right, when a pointer taps on up (U), down (D), left (L), and right (R).

The controller may include a memory configured to store a program and data to control the touch input device 100 and an external device connected to the touch input device 100, e.g., display device, and a processor configured to generate a control signal according to the program and data stored in the memory. The controller is described to be provided in the touch input device 100, but the controller may be provided in the outside of the touch input device 100. For an example, when the touch input device is provided in the vehicle, the controller may be provide inside the vehicle other than the touch input device to control a variety of components of the vehicle as well as the touch input device.

A division of the touch area of the touch unit 110 may be visually displayed. For an example, the edge portion (U, D, L, R) of the touch unit may be displayed by an arrow, and the center portion (C) and the edge portion (U, D, L, R) of the touch unit may be displayed with a different color. In addition, a light emitting diode (LED) may be installed any one of the center portion (C) and the edge portion (U, D, L, R) of the touch unit so that any one of the center portion (C) and the edge portion (U, D, L, R) of the touch unit may be brighten.

Furthermore, a division of the touch area of the touch unit 110 may be not visually displayed. In this case, when a user touches the center area of the touch unit 110, it may be recognized that the center portion (c) is touched, and when a user touches an upper area of the touch unit 110, it may be recognized that the "up" portion (U) of the edge portion is touched.

Furthermore, a division of the touch area of the touch unit 110 may be tactually displayed. The center portion (C) and the edge portion (U, D, L, R) of the touch unit may have different texture or different temperature to be distinguished from each other.

When a pointer moves while being in contact with the touch unit 110 the controller may recognize as a gesture signal, may identify the shape of the gesture by tacking the movement of the pointer, and may perform a pre-determined command based on the shape of the gesture. For example, the controller may move a cursor or a menu on the display device based on a trajectory in which the pointer moves on the touch unit 110. That is, when the pointer moves from the upper portion to the lower portion, a cursor displayed on the display device may be moved in the same direction or a pre-selected menu may be moved to a sub menu from a top menu.

The controller may analyze a trajectory, on which the pointer moves, may correspond the trajectory to a pre-determined gesture, and then may operate a command which is defined to the corresponding gesture. When the pointer performs flicking, swiping, rolling, circling, spin, or tap, the controller may recognize flicking, swiping, rolling, circling, spin, or tap and may operate a command corresponding flicking, swiping, rolling, circling, spin, or tap. In addition, the user may input a gesture by using a variety of touch input methods.

Flicking or swiping may represent a touch input method performed in a way that a pointer moves in one direction while being in contact with the touch unit 110, and then the contact state is released, rolling may represent a touch input method of drawing an arc with respect to the center of the touch unit 110, spin may represent a touch input method of drawing a circle with respect to the center of the touch unit 110, and tap may represent a touch input method of tapping the touch unit 110. Tap may include a multi tap method performed by continuously tapping.

A user may input gesture by using a multi-pointer input technology. The multi-pointer input technology may represent a method of inputting a gesture in a state in which two pointers are contacted simultaneously or sequentially. For example, a gesture may be input while two fingers are contacted to the touch unit 110. A user may input a gesture by using the multi-pointer input technology as well as the single pointer input technology and thus a variety of commands may be delivered.

The user may input a gesture by drawing character, number, or pre-determined symbol. For example, Korean consonants and vowels, Alphabet, Arabic numeral, four arithmetic symbols may be drawn. The user may directly input a character or the number intended to be input, so that an input time may be reduced and an intuitive interface may be provided.

Hereinbefore the touch unit 110 provided in the bottom unit 132 is described, but the touch unit 110 may be provide in any position in the protrusion unit 120 and the recessed unit 130. As the mounting position of the touch unit 110 is various, a user may input a variety of commands.

Hereinafter when the touch unit 110 is provided in the protrusion unit 120, a touch input signal input to the touch input device 110 will be described.

The protrusion unit 120 may be provided to allow a touch input. For an example, a user may input a touch signal by rotating the outer surface portion 121 of the protrusion 120 while holding or by dragging the pointer in a protrusion direction of the protrusion 120 or an opposite direction to the protrusion direction while holding the outer surface portion 121. Herein, since the protrusion unit 120 is fixed to the mounting surface 140, the protrusion unit 120 may be not physically rotated or moved, but the controller may recognize that a user's hand, which is one example of the pointer, is slipped while being contact with the outer surface portion 121.

The outer surface portion 121 of the protrusion unit 120 provided to allow the touch input may correspond to a dial input. The dial may be mounted to a knob and physically rotatable. The dial may be used to adjust a volume based on the rotation. When the outer surface portion 121 of the protrusion unit 120 is provided to allow the touch input, a user may achieve the same result as operating the dial by rotating the outer surface portion 121 while holding the outer surface portion 121. In addition, a user may operate a dial by dragging the pointer upward in the protrusion direction of the protrusion unit 120 while holding the outer surface portion 121, that is upward-dragging, or by dragging the pointer downward in the opposite direction to the protrusion direction of the protrusion unit 120 while holding the outer surface portion 121, that is downward-dragging. Dragging the pointer in the protrusion direction or in the opposite direction to the protrusion direction of the protrusion unit 120 while holding the outer surface portion 121 will be described later. The outer surface portion 121 may be formed by an inclined surface or a curved surface having a negative curvature. Herein the negative curvature may represent a curvature formed to be concave while viewing from the outside of the outer surface portion 121.

The ridge unit 122 of the protrusion unit 120 may be provided to allow a touch input. In this case, a user may input a rolling gesture by drawing a circle along the ridge unit 122 while being in contact with the ridge unit 122.

The inner surface portion 131 of the recessed unit 130 or the connection unit 133 of the recessed unit 130 may be provided to allow a touch input.

Figure 4:
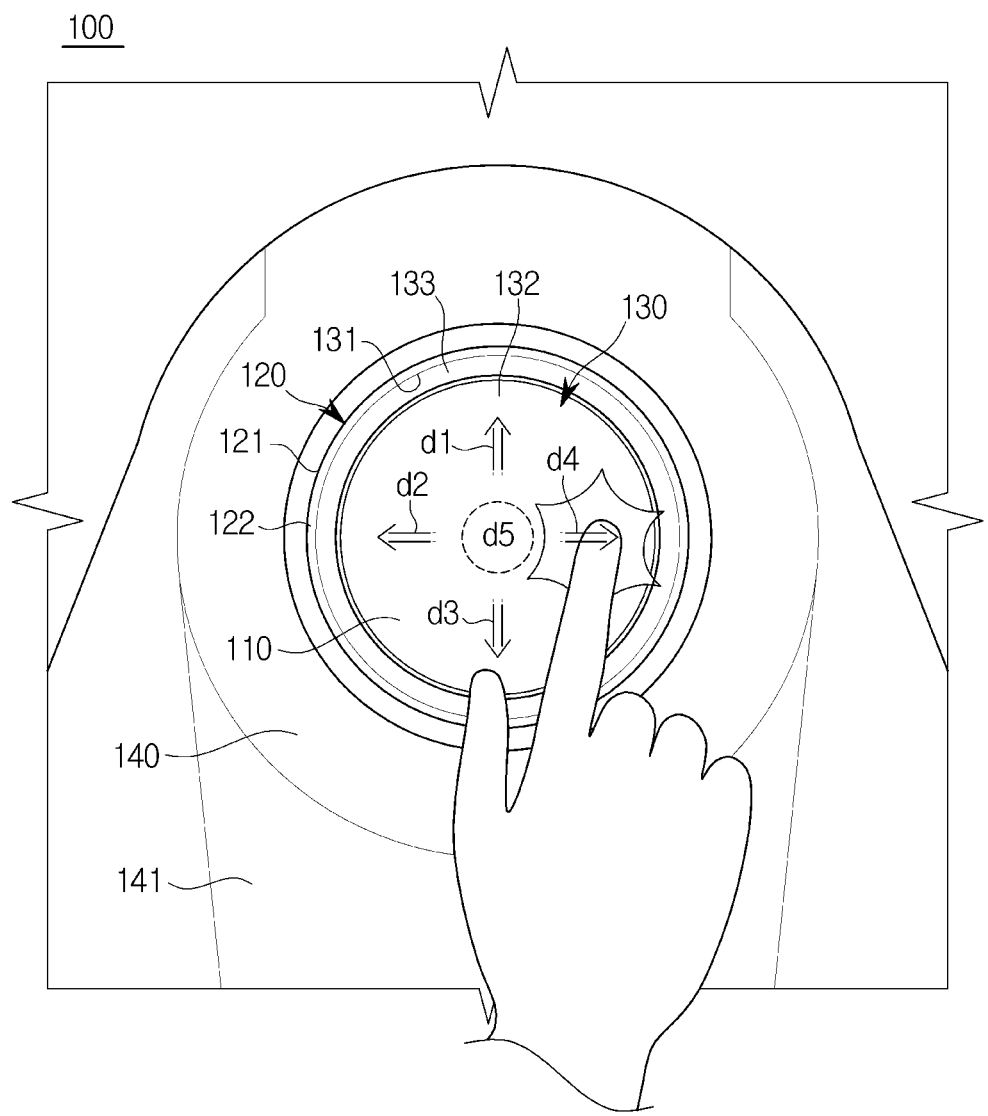
FIGS. 4 to 6 are views illustrating an operation of a touch input device in accordance with a first embodiment of the present disclosure, particularly
Figure 5:
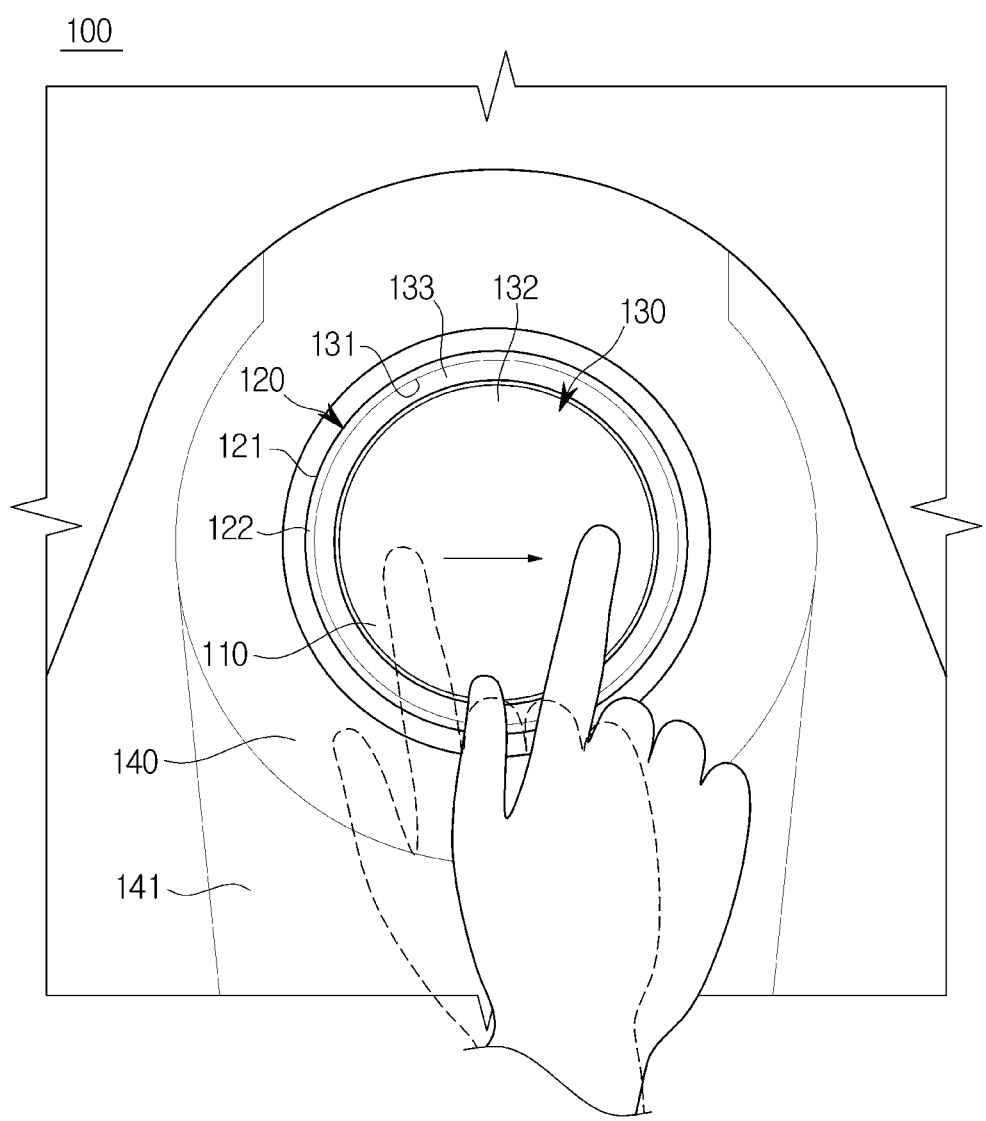
Figure 6:
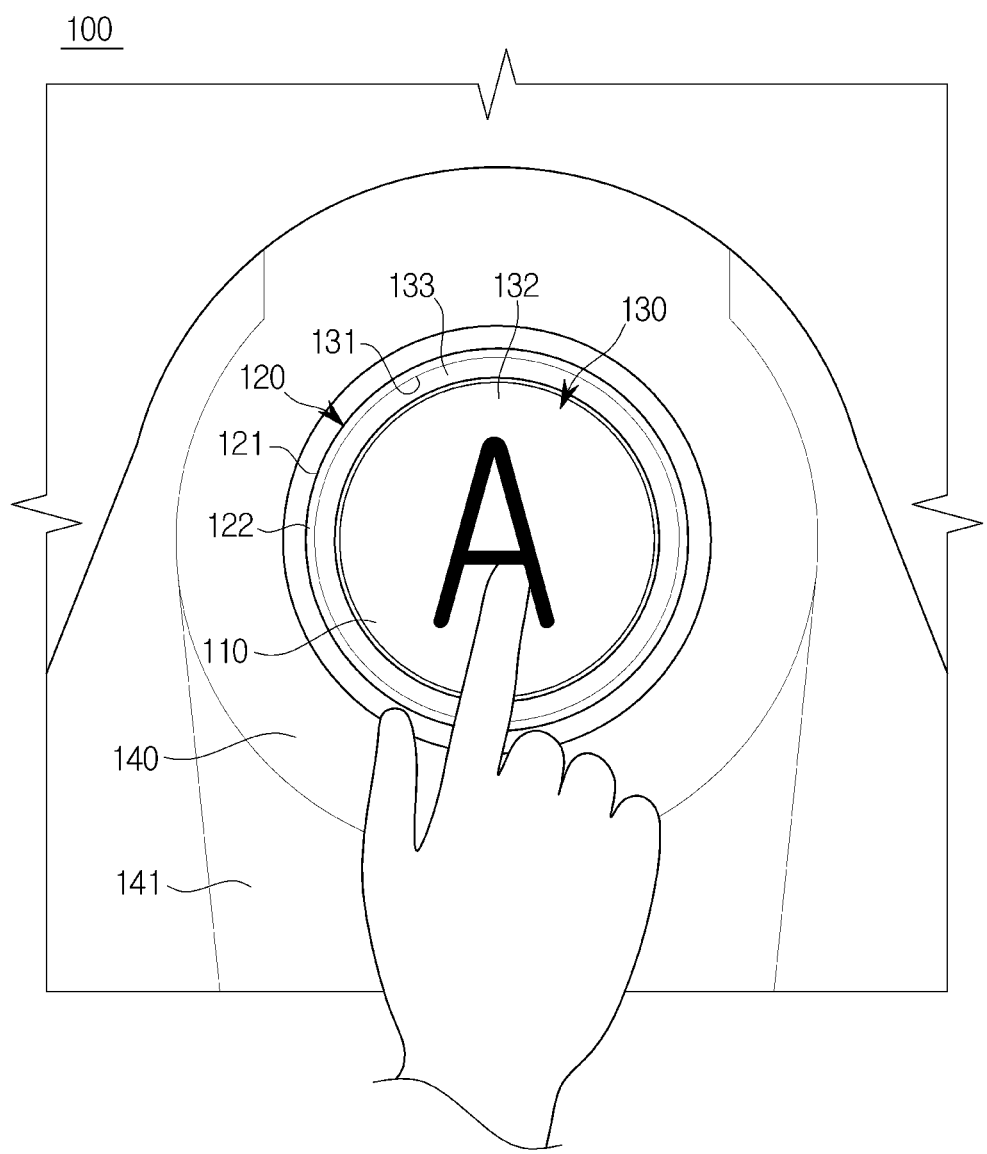

FIGS. 4 to 6 are views illustrating an operation of a touch input device in accordance with a first embodiment of the present disclosure, particularly FIG. 4 is a view of inputting a press, FIG. 5 is a view of inputting swiping, and FIG. 6 is a view of inputting a character.

As explained above, a case in which a user may input a pre-determined operation signal by a tap gesture by tapping a part of the touch unit 110 is described. In addition, the touch unit 110 may be provided to allow pressing gesture or tilting gesture. In addition, when the touch unit 110 is provided to be flexible, only a part of the touch unit 110 to which a pressure is applied may be pressed.

The touch unit 110 may be tilted in at least one direction (d1 to d4) with respect to a central axis of the touch unit 110. As illustrated in FIG. 4, the touch unit 110 may be tilted in four directions of front, back, left and right (d1 to d4), but is not limited thereto. The touch unit 110 may be provided to be tilted in various directions according to embodiments. In addition, when pressing a central portion d5 of the touch unit 110, the touch unit 110 may be pressed in a flat manner.

The bottom unit 132 in which the touch unit 110 is provided may be independently moved from the inner surface portion 131. The bottom unit 132 may be provided to allow a press gesture or to allow an inclined or a tilting gesture. For an example, when a user applies a pressure to the touch unit 110, an area of the bottom unit 132 to which the pressure is applied may be pressed or tilted in a direction where the pressure is applied.

A user may input a pre-determined operation signal by pressing or tilting a part of the touch unit 110 by applying the pressure. For an example, the user may operate a selected menu by pressing the center portion (d5) of the touch unit 110 and the user may move a cursor to the upper portion by pressing the upper portion (d1).

The press structure of the touch unit 110 may include a button (not shown) installed in the lower portion of the touch unit 110. The button may be provided to be clickable. That is, a user may input a touch signal by touching the touch unit 110 and at the same time a user may input a click signal by pressing the touch unit 110.

A single button may be provided under the touch unit 110. In this case, a user may input a click signal by clicking the center of the touch unit 110 and may input a touch signal by tapping the center, up, down, left side, and right side of the touch unit 110.

A plurality of buttons may be provided under the touch unit 110. For an example, five buttons may be provided in the center, up, down, left side, and right side of the touch unit 110. In this case, a user may input a different click signal by clicking the center, up, down, left side, and right side of the touch unit 110, and may input a touch signal by tapping the center, up, down, left side, and right side of the touch unit 110.

Although not shown in the drawings, a variety components related to the operation may be embedded in the touch input device 100. In the inside of the touch input device 100, the above-mentioned structure configured to be pressed or tilted in five directions (d1 to d5) may be included. However, those structures may be implemented by well-known technology and thus a detailed description will be omitted in the present disclosure.

In addition, a variety of semiconductor chips and Printed Circuit Board (PCB) may be installed in the touch input device 100. The semiconductor chip may be installed in the PCB and may perform information process or storing data. The semiconductor chip may analyze a certain electrical signal, which is generated by an external force applied to the touch input device 100, a gesture recognized in the touch unit 110, and an operation of the button provided in the touch input device 100, may generate a certain control signal based on the analyzed content, and may transmit the control signal to the controller or the display device of another device.

Referring to FIG. 5, a user may input a pre-determined operation signal by a flicking gesture or a swiping gesture performed by swiping an area of the touch unit 110. For an example, a user may move a menu to the next menu displayed on the display device by swiping in the right direction while being in contact with the left side of the touch unit 110.

Referring to FIG. 6, a user may input a pre-determined operation signal by drawing the number, character, or a pre-determined gesture on the touch unit 110. For an example, a user may input "A" on an input area of the display device by inputting letter "A" to the touch unit 110. A user may more easily and more quickly input a character intended to be input by directly inputting a character to the touch input 110 than by selecting a corresponding character in a character table arranged in the display device.

Figure 7:
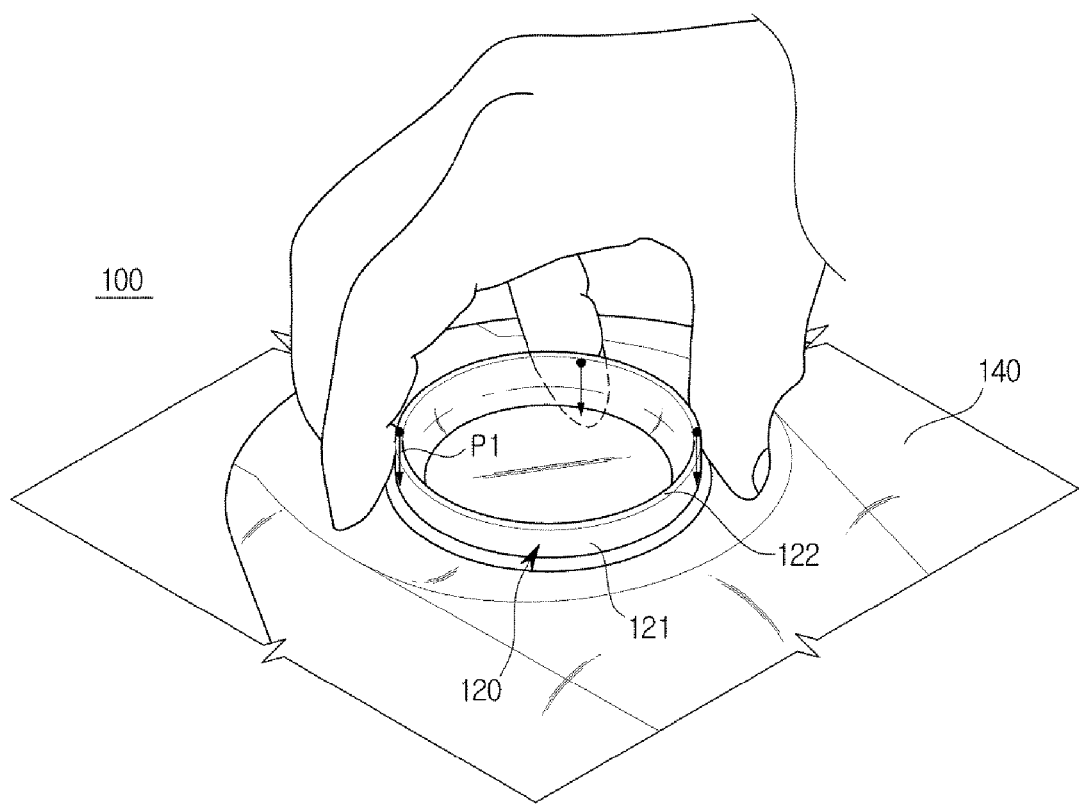
FIGS. 7 to 9 are views illustrating a touch input motion in an outer surface portion of a touch input device in accordance with a first embodiment of the present disclosure, particularly
Figure 8:
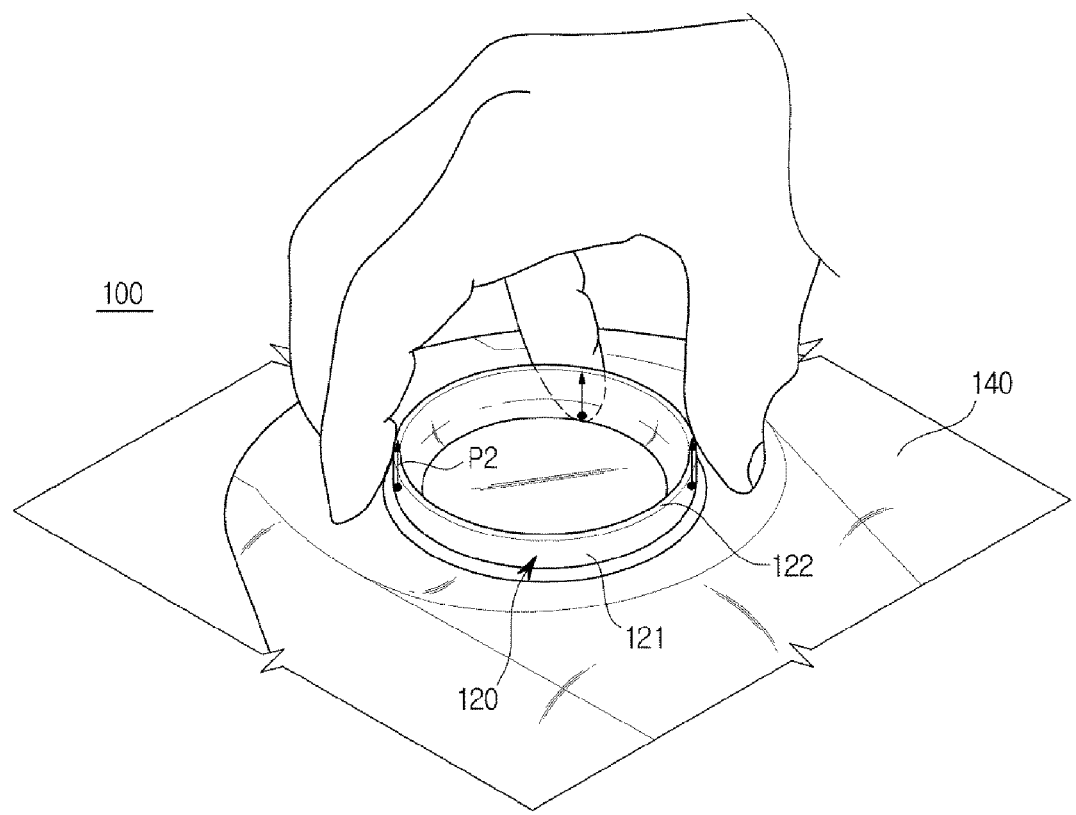
Figure 9:
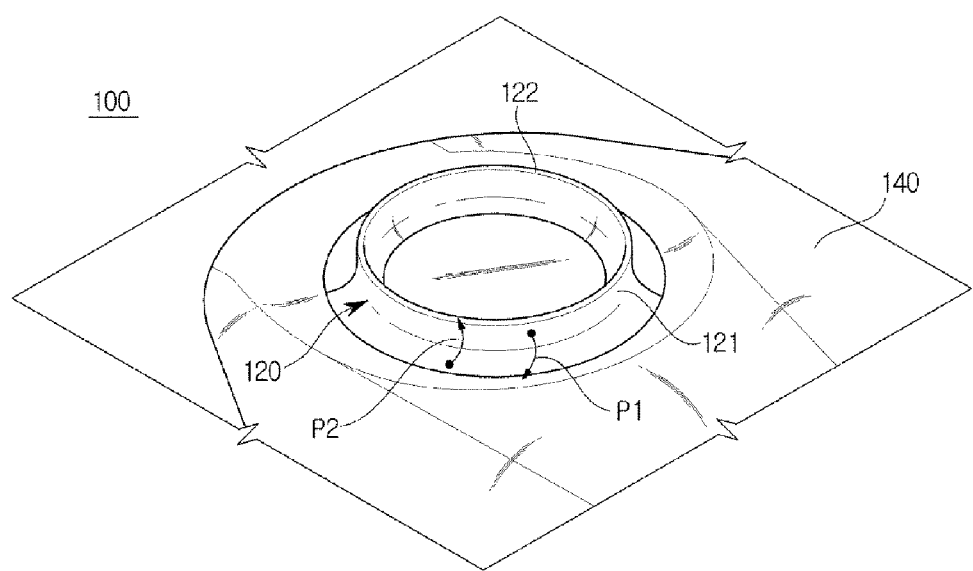

FIGS. 7 to 9 are views illustrating a touch input motion in an outer surface portion of a touch input device in accordance with a first embodiment of the present disclosure, particularly FIG. 7 is a view of inputting a touch in an opposite direction to a protrusion direction of a protrusion unit, FIG. 8 is a view of inputting a touch in a protrusion direction of a protrusion unit, and FIG. 9 is a view of an exterior of a touch input device including an outer surface portion formed by an inclined surface.

Referring to FIG. 7, an input in an opposite direction P1 to the protrusion direction of the protrusion unit 120 may represent an input in an opposite direction to a direction in which the protrusion 120 of the touch input device 100 is protruded from the mounting surface 140, and referring to FIG. 8, an input in the protrusion direction P2 of the protrusion unit 120 may represent an input in a direction in which the protrusion 120 of the touch input device 100 is protruded from the mounting surface 140.

That is, the outer surface portion 121 of the touch input device 100 may receive an input of a touch input signal in the opposite direction P1 to the protrusion direction or the protrusion direction P2 of the protrusion unit 120, and may recognize the input in the opposite direction P1 to the protrusion direction and the input in the protrusion direction P2 of the protrusion unit 120 as a different gesture.

The outer surface portion 121 may receive an input of a plurality of touch input signals, e.g., multi-touch, corresponding to a plurality of pointers, and each pointer may be moved in any one direction of the opposite direction P1 to the protrusion direction or the protrusion direction P2 of the protrusion unit 120. In this case, the controller may determine an input direction, which is the user intended, based on the input direction of the plurality of touch input signals.

For example, when pointers more than half of the plurality of pointers are dragged in the opposite direction P1 to the protrusion direction of the protrusion unit 120, the controller of the touch input device 100 may determine that the user's intention is dragging in the opposite direction P1 to the protrusion direction, and when pointers more than half of the plurality of pointers are dragged in the protrusion direction P2 of the protrusion unit 120, the controller of the touch input device 100 may determine that the user's intention is dragging in the protrusion direction P2.

Meanwhile, as illustrated in FIG. 9, when the outer surface portion 121 is formed by an inclined surface or a curved surface having a negative curvature, an input in the opposite direction P1 to the protrusion direction may correspond to a motion of spreading the finger while dragging the pointer downward along the inclined surface, and an input in the protrusion direction P2 may correspond to a motion of pinching the finger while dragging the pointer upward along the inclined surface.

In addition, the controller of the touch input device 100 may generate a variety of control signals based on a touch input signal in the above-mentioned outer surface portion 121, and another component of the touch input device 100 or another device connected to the touch input device 100 may perform a variety of operations based on the generated control signal.

According to embodiments, the display device may receive a control signal from the touch input device 100 and may output a screen based on the control signal.

Figure 10:
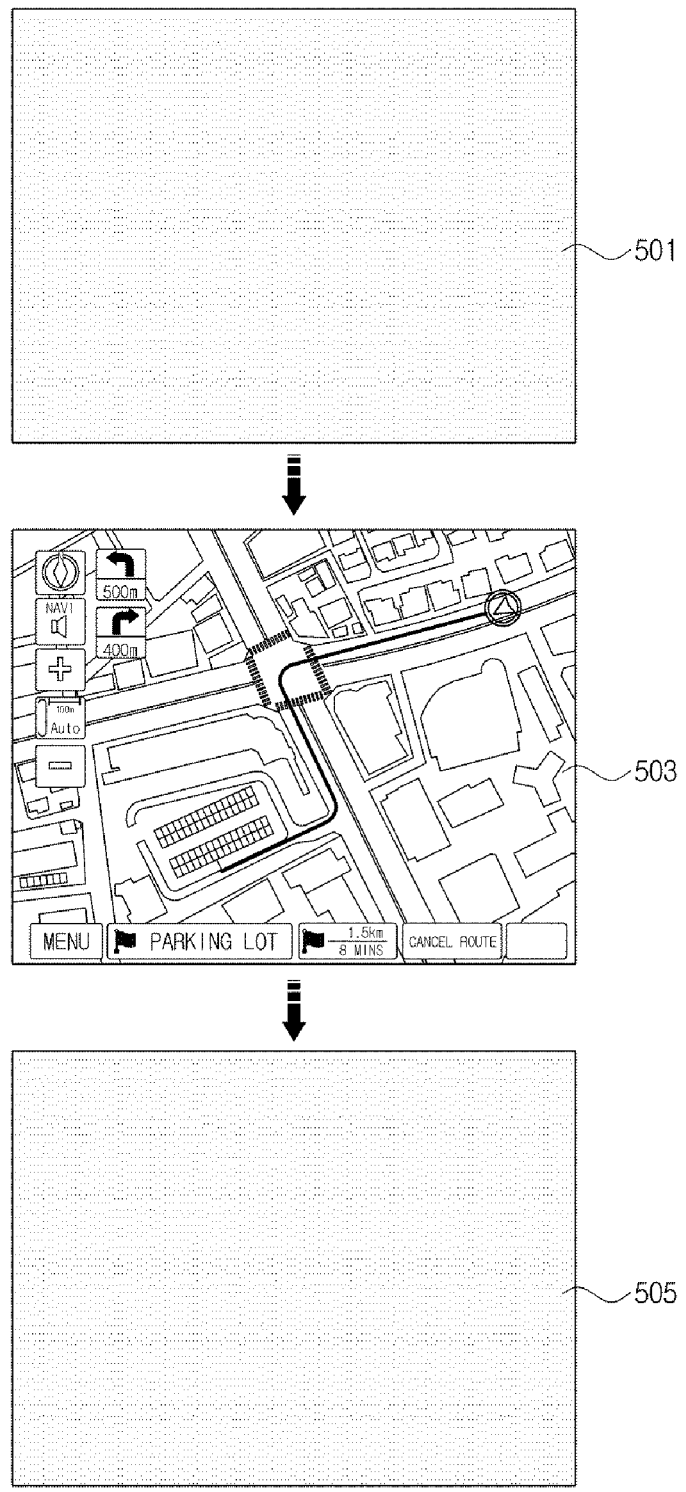
FIGS. 10 and 11 are views illustrating an example of a screen outputted by a display device based on a control signal.
Figure 11:
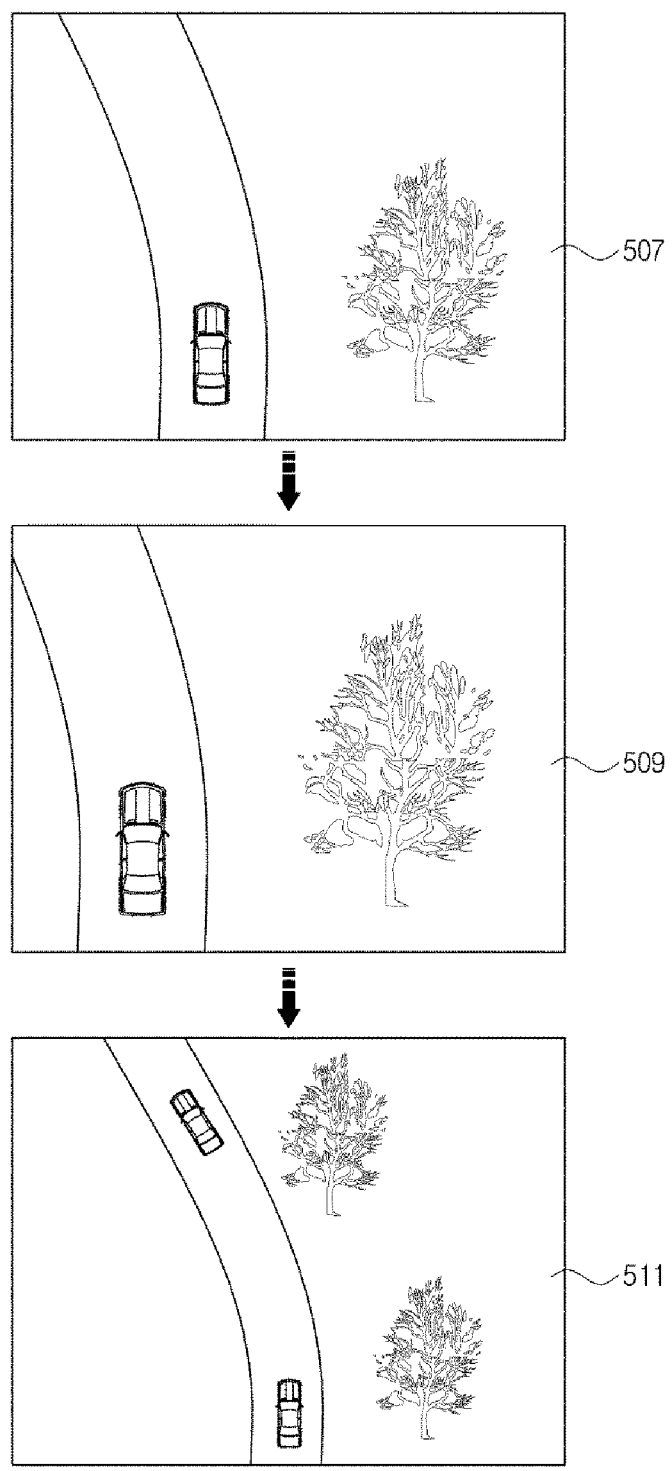

FIGS. 10 and 11 are views illustrating an example of a screen outputted by a display device based on a control signal.

For example, as shown in FIG. 10, in a state in which a screen of the display device is turned off (hereinafter, referred to as "standby mode" 501), when the outer surface portion 121 of the touch input device 100 receives a gesture in the opposite direction P1 to the protrusion direction of the protrusion unit 120, the display device may turn on a screen, i.e., wake-up, or may output a pre-determined screen (503), e.g., call hidden menu. In addition, in a state in which a screen of the display device is turned on (503), when the outer surface portion 121 of the touch input device 100 receives a gesture in the protrusion direction P2 of the protrusion unit 120, the display device may enter the standby mode again (505).

In contrast, in a state in which a screen of the display device is turned off (hereinafter, referred to as "standby mode" 501), when the outer surface portion 121 of the touch input device 100 receives a gesture in the protrusion direction P2 of the protrusion unit 120, the display device may turn on a screen, i.e., wake-up, or may output a pre-determined screen (503), e.g., call hidden menu. In addition, in a state in which a screen of the display device is turned on (503), when the outer surface portion 121 of the touch input device 100 receives a gesture in the opposite direction P1 to the protrusion direction of the protrusion unit 120, the display device may enter the standby mode again (505).

As another example, referring to FIG. 11, in a state in which the display device outputs content (507), when the outer surface portion 121 of the touch input device 100 receives a gesture in the opposite direction P1 to the protrusion direction of the protrusion unit 120, the display device may zoom-in on a screen (509). In addition, in a state in which the display device outputs content (509), when the outer surface portion 121 of the touch input device 100 receives a gesture in the protrusion direction P2 of the protrusion unit 120, the display device may zoom-out from a screen (511).

In contrast, in a state in which the display device outputs content (507), when the outer surface portion 121 of the touch input device 100 receives a gesture in the protrusion direction P2 of the protrusion unit 120, the display device may zoom-in a screen (509). In addition, in a state in which the display device outputs content (509), when the outer surface portion 121 of the touch input device 100 receives a gesture in the opposite direction P1 to the protrusion direction of the protrusion unit 120 of the protrusion unit 120, the display device may zoom-out a screen (511).

Meanwhile, a touch input device that receives input of these gestures may be applied to a touch input device having various protrusion shapes as well as the touch input device 100 according to the first embodiment.

Figure 12:
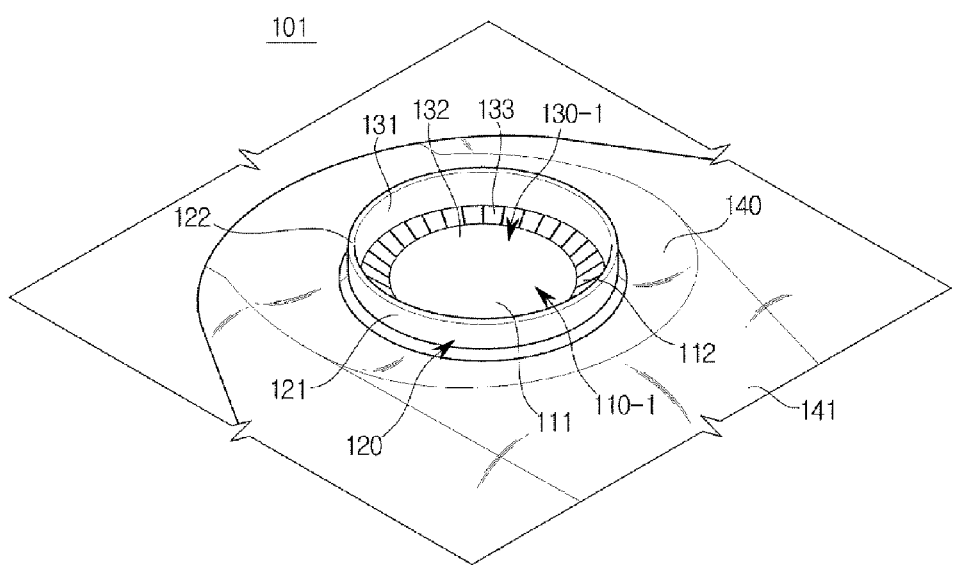
FIG. 12 is a perspective view of a touch input device in accordance with a second embodiment of the present disclosure.
Figure 13:
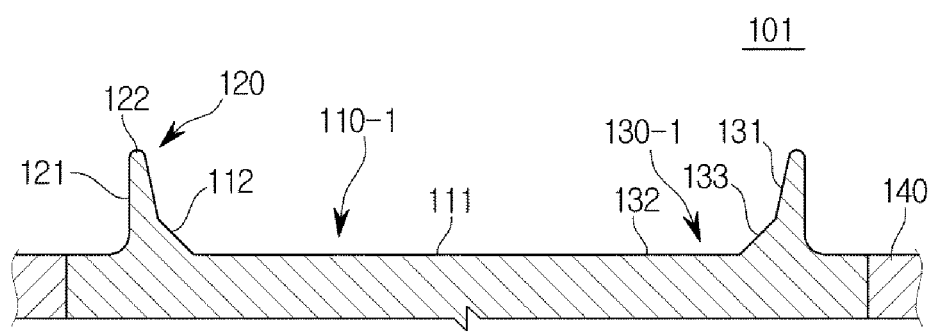
FIG. 13 is a cross-sectional view of a touch input device in accordance with a second embodiment of the present disclosure.

FIG. 12 is a perspective view of a touch input device in accordance with a second embodiment of the present disclosure and FIG. 13 is a cross-sectional view of a touch input device in accordance with a second embodiment of the present disclosure.

According to a second embodiment, a recessed unit 130-1 of a touch input device 101 may include a connection unit 133 configured to connect an inner surface portion 131 to a bottom unit 132. The connection unit 133 may be formed by an inclined surface or a curved surface having a negative curvature. Herein the negative curvature may represent a curvature formed to be concave while viewing from the outside of the recessed unit 130-1.

The connection unit 133 may be provided to allow a touch input. A user may input a touch signal by contacting the connection unit 133 or by moving the connection unit 133 while being in contact with the connection unit 133. The connection unit 133 may be formed by an inclined surface or a curved surface having a negative curvature so that a user may easily input a touch. A user may input a pre-determined operation command by touching or swiping an area to which the inner surface portion 131 and bottom unit 132 are connected.

A user may intuitively recognize a position of the connection unit 133 without watching the touch input device 101, e.g., watching the front or watching the display device. This is because the inner surface portion 131 may be provided in the outside of the connection unit 133 as well as the shape of the connection unit 133 may have an inclined surface or a curved surface. Therefore, the user may input a pre-determined operation command without watching the connection unit 133.

According to the second embodiment, a touch unit 110-1 may include a center touch unit 111 provided in the bottom unit 132 and an edge touch unit 112 provided in the connection unit 133. A touch pad provided in the center touch unit 111 and a touch pad provided in the edge touch unit 112 may be integrally or individually provided.

Meanwhile, a touch pad provided in the edge touch unit 112 may be provided to be extended to the inner surface portion 131. A user may input a pre-determined operation command by touching the inner surface portion 131 as well as by touching the connection unit 133. Alternatively, the connection unit 133 and the inner surface portion 131 may receive each input signal different from each other. That is, when the user touches the connection unit 133 and when a user touches the inner surface portion 131, each operation command different from each other may be input.

Figure 14:
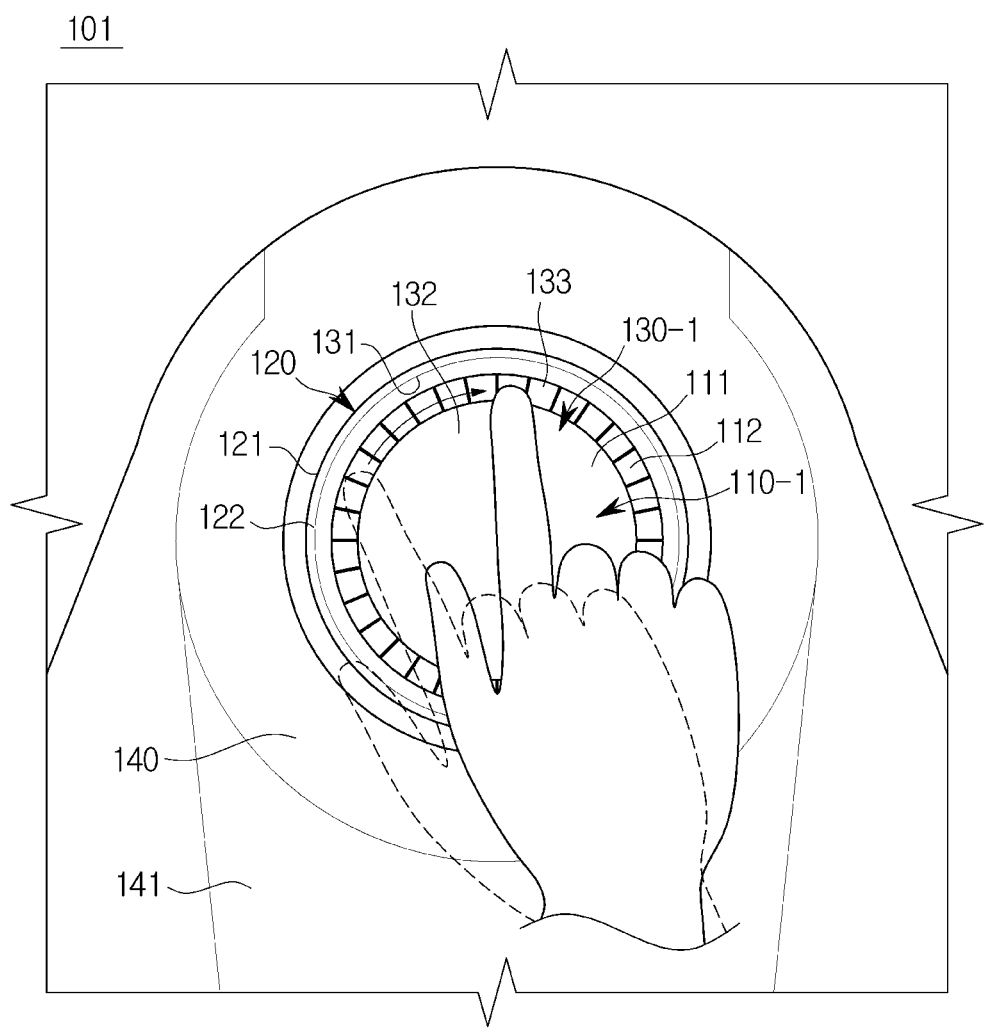
FIG. 14 is a plane view of inputting a rolling to describe a touch gesture of a touch input device in accordance with a second embodiment of the present disclosure.

FIG. 14 is a plane view of a inputting a rolling to describe a touch gesture of a touch input device in accordance with a second embodiment of the present disclosure.

Rolling may represent a touch input method of drawing an arc with respect to the center of the touch unit 110-1, spin may represent a touch input method of drawing a circle with respect to the center of the touch unit 110-1. In the drawings, rolling is illustrated, but circling or spin may be included.

A user may perform rolling, circling or spin by touching the edge touch unit 112. As for rolling, as an example, when a user inputs a rolling touch by touching the edge touch unit 112, a different command may be operated depending on a direction of the rolling, a position in which the rolling touch is performed, or a length in which the rolling touch is performed.

For example, when a pointer swipes the edge touch unit 112 clockwise or counterclockwise, a different touch input may be provided, respectively. In addition, when the pointer taps the left side of the edge touch unit 112 or the right side of the edge touch unit 112, a different touch input may be provided, respectively. In addition, in a state of in which the pointer touches a single point of the edge touch unit 112, when the pointer moves along the edge touch unit 112, a different touch input may be provided according to a position in which the touch of the pointer is terminated.

The connection unit 133 (or the edge touch unit 112) may include gradations provided with a certain distance. The gradation may be provided to be engraved or embossed. When a user swipes the connection unit 133 by using the finger as the pointer, the user may intuitively recognize the number of the gradation, which is passed by the finger, trough the sense felt in the finger without watching the gradation. For an example, when a user inputs a rolling touch to the connection unit 133 clockwise with a length of five gradations, a cursor displayed on the display unit may be moved to the right side or clockwise with five steps.

Hereinabove rolling, circling or spin are described, but tap in which a user taps a single point of the edge touch unit 112 may be input as a touch signal. In this case, a different command may be delivered according to a position in which the user touches. For an example, when a user contacts an upper portion of the edge touch unit 112, a cursor displayed on the display unit may be moved upward.

Figure 15:
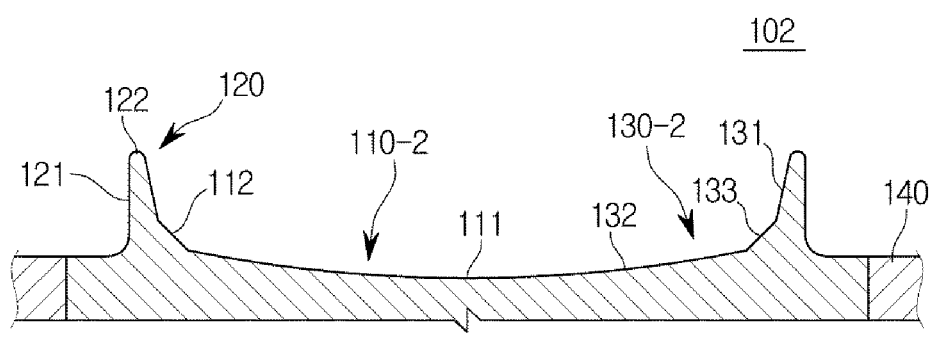
FIG. 15 is a cross-sectional view of a touch input device in accordance with a third embodiment of the present disclosure.

FIG. 15 is a cross-sectional view of a touch input device in accordance with a third embodiment of the present disclosure.

According to a third embodiment, a bottom unit 132 of a recessed unit 130-2 of a touch input device 102 may have a concave shape. For an example, the bottom 132 may include a concave curved shape. Referring to FIG. 15, the bottom 132 may be provided in a concave surface having a certain curvature. The curvature of the bottom 132 may vary. For example, the curvature of the center may be small, that is the radius of curvature of the center may be large, and the curvature of the edge may be large, that is the radius of curvature of the edge may be small.

A touch unit 110-2 may be provided in the bottom unit 132. The touch unit 110-2 may include a concave shape provided in the bottom unit 132. For an example, an area of the touch unit 110-2 may be consistent with the concave shape provided in the bottom unit 132.

Figure 16:
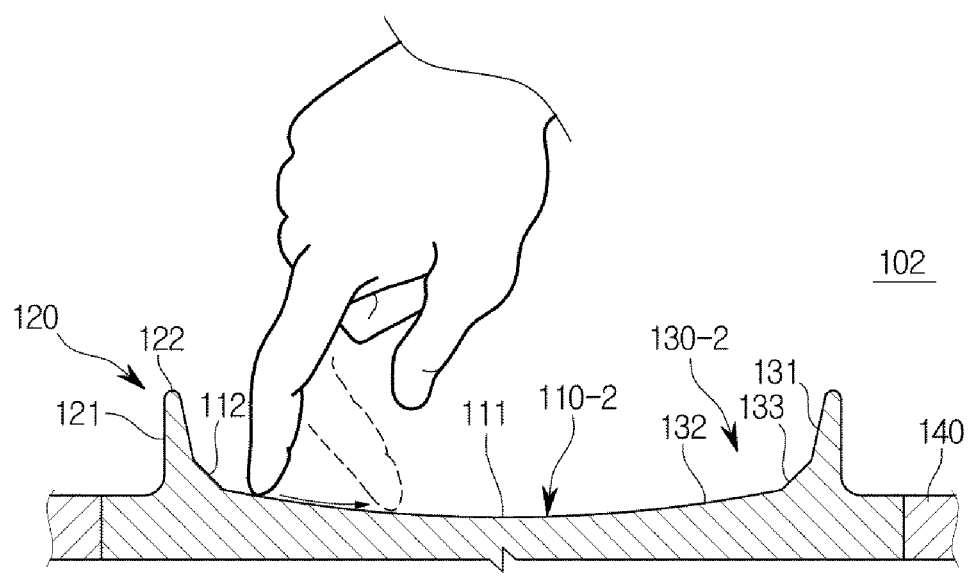
FIG. 16 is a view illustrating a finger's trajectory when a user inputs a gesture vertically.
Figure 17:
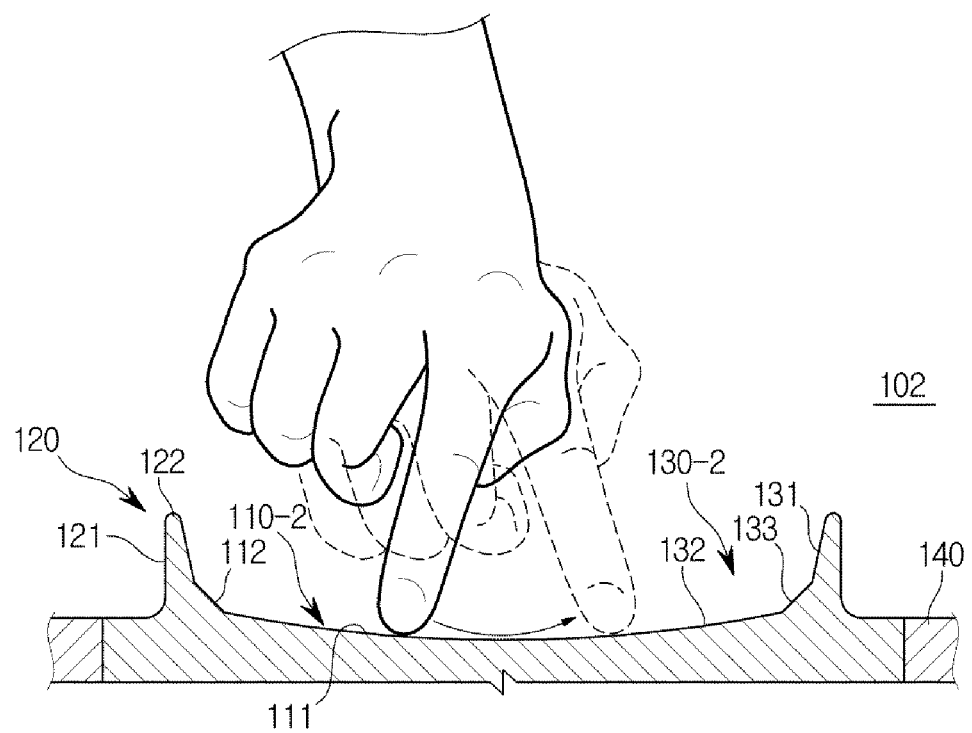
FIG. 17 is a view illustrating a finger's trajectory when a user inputs a gesture horizontally.

FIG. 16 is a view illustrating a finger's trajectory when a user inputs a gesture vertically and FIG. 17 is a view illustrating a finger's trajectory when a user inputs a gesture horizontally.

The touch unit 110-2 may include a curved surface, and thus when inputting a gesture, a sense of touch or a sense of operation, which is felt by the user, may be improved. The curved surface of the touch unit 110-2 may be provided to be similar with a trajectory which is made by a movement of the end of the finger when a person moves the finger or rotates or twists the wrist with stretching the finger, in a state in which a person fixes her/his wrist.

In comparison with conventional plane touch unit, the touch unit 110-2 having a concave surface according to the third embodiment may be formed in an ergonomic manner. That is, stress applied to the wrist may be reduced as well a sense of operation of a user may be improved. In addition, in comparison with a case of inputting a gesture to a plane touch unit, the input accuracy may be enhanced.

As shown in FIG. 16, when a user moves the finger up and down, the user may input a gesture with a natural movement of the finger without moving or folding the joints except for the finger. Similarly, as shown in FIG. 17, a user may input a gesture with a natural movement of the finger and the wrist without excessively twisting the wrist when the user moves the finger in the left side and the right side. According to embodiments, a shape of the touch unit 110-2 may be provided in an ergonomic manner so that a user feel less fatigue with the use of a long period of time, and user's muscloskeletal disease, which is may occur in the wrist or other joint, may be prevented.

The touch unit 110-2 may be formed in a circular shape. When the touch unit 110-2 is provided in a circular shape, a concave surface may be easily formed. In addition, since the touch unit 110-2 is formed in a circular shape, a user may detect a touch area of the circular touch unit 110-2 by the tactility and thus a user may easily input a rolling or a circling gesture.

In addition, since the touch unit 110-2 has a curved surface, a user may intuitively recognize that the finger is placed which position of the touch unit 110-2. The touch unit 110-2 may have a curved surface so that an inclination may vary according to a portion of the touch unit 110-2. Therefore, the user may intuitively recognize that a finger is placed which position of the touch unit 110-2 through a sense of inclination, which is felt through the finger.

Accordingly, when the user inputs a gesture to the touch unit 110-2 in a state in which the user stares at a point besides the touch unit 110-2, a feedback related to a position of the touch unit 110-2 where the finger is placed, may be provided to help the user to input a needed gesture, and may improve the input accuracy of gesture.

A touch pad used in the touch unit 110-2 provided in a curved surface may recognize a touch by using optical technology. For example, on a rear surface of the curved touch unit 110-2, Infrared Light Emitting Diode (IR LED) and photodiode array may be disposed. The IR LED and photodiode array may acquire an infrared image reflected by the finger, and the controller may extract a touch point from the acquired image.

A diameter and a depth of the touch unit 110-2 may be formed in an ergonomic manner. For example, a diameter of the touch unit 110-2 may be selected from approximately 50 mm to approximately 80 mm.

Given the average length of a finger of an adult, a range of the finger, which is made by the natural movement of the finger at a time in a state of fixing the wrist, may be selected within approximately 80 mm. Therefore, in a state of in which a diameter of the touch unit 110-2 is larger than approximately 80 mm, the hand may be unnaturally moved and the wrist may be excessively used when a user draws a circle in a center touch unit 111.

In contrast, when a diameter of the touch unit 110-2 is less than approximately 50 mm, an area of the touch area may be reduced and thus a diversity of input gesture may be reduced. In addition, the gesture may be made in a narrow area and thus gesture input errors may be increased.

In addition, when the touch unit 110-2 may be provided in a spherical surface, a value acquired by dividing a depth of the touch unit 110-2 by a diameter may be selected from approximately 0.04 to approximately 0.1. The value acquired by dividing a depth of the touch unit 110-2 by a diameter may represent a degree of bend of a curved surface of the touch unit 110-2. That is, in the same diameter, as a value acquired by dividing a depth of the touch unit 110-2 by a diameter is larger, the curved surface of the touch unit 110-2 may have a more concave shape, and in contrast, as a value acquired by dividing a depth of the touch unit 110-2 by a diameter is smaller, the curved surface of the touch unit 110-2 may have more flat shape.

When a value acquired by dividing a depth of the touch unit 110-2 by a diameter is larger than approximately 0.1, the curvature of the concave shape may be large and thus user's sense of touch may become uncomfortable. Therefore, it may be appropriate that the curved surface of the touch unit 110-2 is identical to the curvature of a curved line, which is drew by the end of the finger in the natural movement of the user's finger. However, when the value acquired by dividing a depth of the touch unit 110-2 by a diameter is larger than approximately 0.1, an excessive strong force may be applied to the finger when a user moves the finger along the curved surface. Accordingly, the user may feel artificial sense of operation. In addition, when the user unconsciously and naturally moves the finger, the end of the finger may be separated from the curved surface. In this case, a touch of gesture may be discontinued and thus the recognition error may occur.

When the depth of the touch unit 110-2 is too lower, it may be difficult for a user to feel a feature of the curved surface in comparison with a flat surface. When the value acquired by dividing a depth of the touch unit 110-2 by a diameter is less than approximately 0.04, a user may hardly feel a difference in a sense of operation between drawing a gesture on the curved surface and drawing a gesture on a flat surface.

According to the third embodiment, a touch unit 110-2 may include a center touch unit 111 provided in the bottom unit 132 and an edge touch unit 112 provided in the connection unit 133. A touch pad provided in the center touch unit 111 and a touch pad provided in the edge touch unit 112 may be integrally or individually formed. A detail description of the edge touch unit 112 may be the same as those shown in the first and second embodiment.

The inclination of the connection unit 133 may be provided to be larger than tangential inclination of curved surface of the bottom unit 132 in the boundary between the connection unit 133 and the bottom unit 132. When a user inputs a gesture in the curved surface of the bottom unit 132, the user may intuitively recognize the touch area of the inclined portion since the inclination of the connection unit 133 is larger than that of the curved surface of the bottom unit 132.

Meanwhile, while a gesture is input to the center touch unit 111, a touch in the edge inclined portion may be not recognized. Therefore, although the user reaches the boundary of the edge touch unit 112 while inputting the gesture to the center touch unit 111, a gesture input to the center touch unit 111 and a rolling gesture input to the edge touch unit 112 may be not overlapped.

Figure 18:
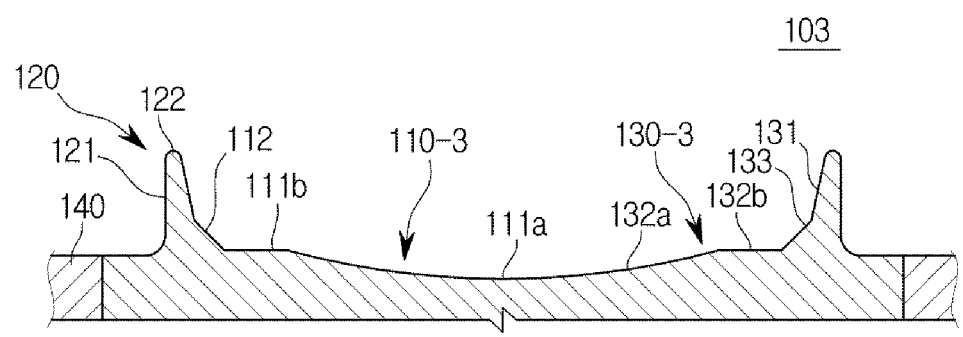
FIG. 18 is a cross-sectional view of a touch input device in accordance with a fourth embodiment of the present disclosure.

FIG. 18 is a cross-sectional view of a touch input device in accordance with a fourth embodiment of the present disclosure.

According to the fourth embodiment, a touch unit 110-3 of a touch input device 103 may include a first center touch unit 111*a* provided by a concave curved surface, a second center touch unit 111*b* configured to surround the first center touch unit 111*a* and provided by a flat surface, and an edge touch unit 112 configured to surround the second center touch unit 111*b* and provided by an inclined surface.

A bottom unit 132 may include a first bottom unit 132*a* placed in the center and provided by a concave surface, and a second bottom unit 132*b* configured to surround the first bottom unit 132*a* and provided by a flat surface.

The first center touch unit 111*a* may be provided in the first bottom unit 132*a*, the second center touch unit 111*b* may be provided in the second bottom unit 132*b*, and the edge touch unit 112 may be provided the connection unit 133 of a recessed unit 130-3. The first center touch unit 111*a*, the second center touch unit 111*b*, and the edge touch unit 112 may independently receive a touch signal. For an example, the first center touch unit 111*a* may receive a gesture touch signal, the second center touch unit 111*b* may receive a direction touch signal, and the edge touch unit 112 may receive a rolling or circling touch signal.

A touch pad of the first center touch unit 111*a*, a touch pad of the second center touch unit 111*b*, and a touch pad of the edge touch unit 112 may be integrally or separately provided. When each touch pad of the first center touch unit 111*a*, the second center touch unit 111*b*, and the edge touch unit 112 is integrally provided, the touch pad may independently receive an input of a touch signal by software.

The first center touch unit 111*a*, the second center touch unit 111*b*, and the edge touch unit 112 may operate a new command by combining touch signals input via each touch unit 110-3. For an example, when a user inputs a flicking or swiping gesture to the first center touch unit 111*a*, an icon in a sub-menu may be shifted, and when a user inputs a flicking or swiping gesture to the first center touch unit 111*a* in a state in which the user contacts the second center touch unit 111*b*, an icon in a main-menu may be shifted. By using the touch input, an operation of changing an icon of the main menu after moving from the sub menu to the main menu may be simplified and thus it may be possible to change the icon of the main menu immediately in the sub menu. That is, it may be possible to move immediately to the navigation menu from the play music menu.

Figure 19:
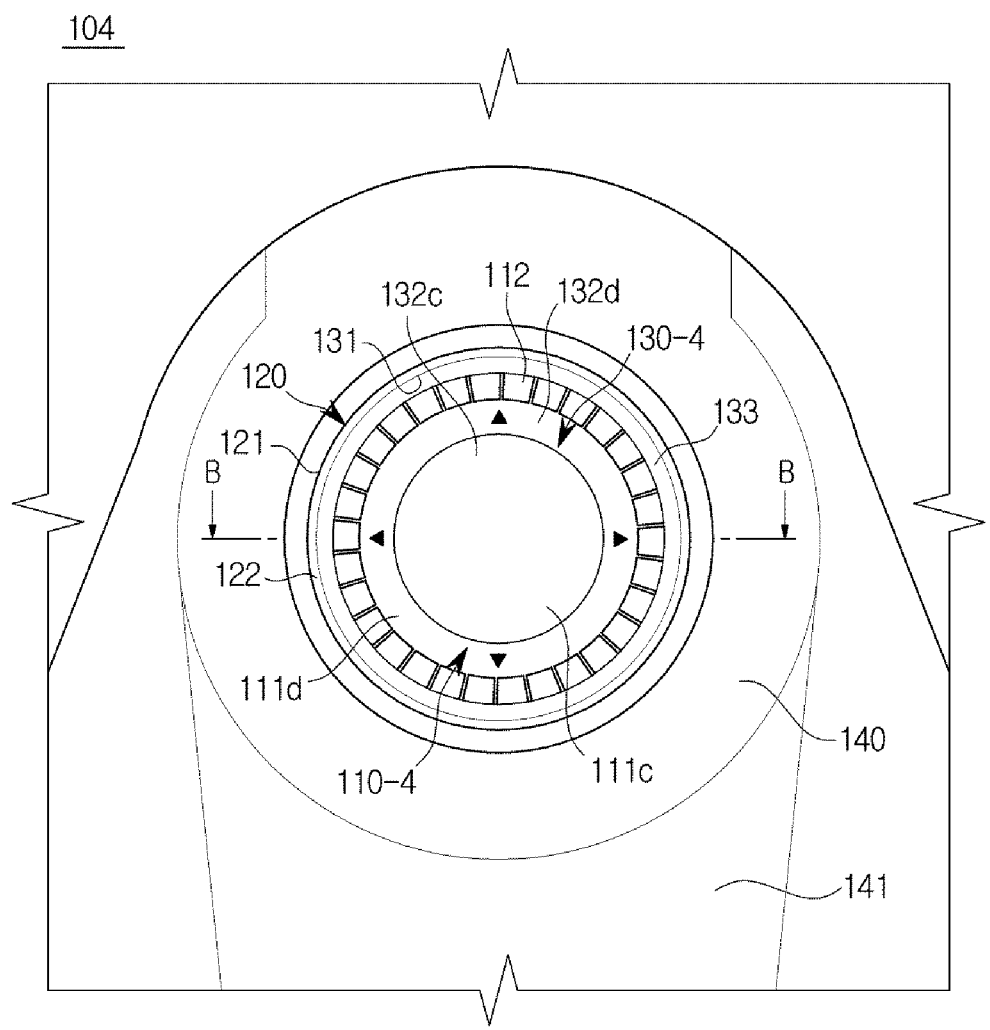
FIG. 19 is a plane view of a touch input device in accordance with a fifth embodiment of the present disclosure.
Figure 20:
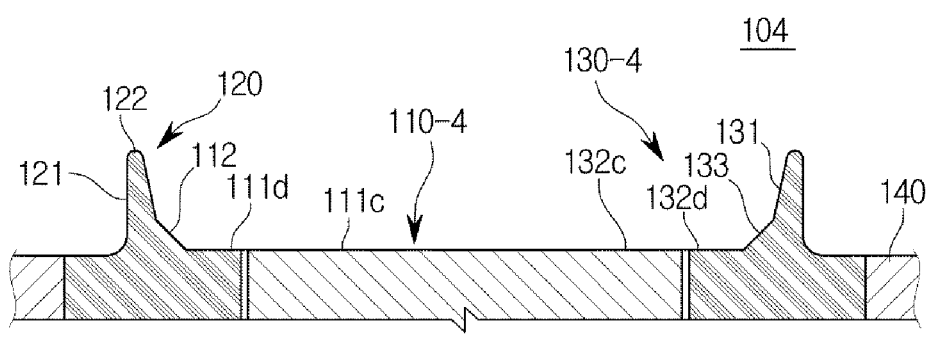
FIG. 20 is a cross-sectional view taken along line B-B' of FIG. 19.

FIG. 19 is a plane view of a touch input device in accordance with a fifth embodiment of the present disclosure and FIG. 20 is a cross-sectional view taken along line B-B' of FIG. 19.

According to the fifth embodiment, a touch unit 110-4 of a touch input device 104 may include a first center touch unit 111*c*, a second center touch unit 111*d* configured to surround the first center touch unit 111*c*, and an edge touch unit 112 configured to surround the second center touch unit 111*d* and provided by an inclined surface.

A bottom unit 132 may include a first bottom unit 132*c* placed in the center, and a second bottom unit 132*d* configured to surround the first bottom unit 132*c*. The first bottom unit 132*c* may be separately provided from the second bottom unit 132*d*. Therefore, the first bottom unit 132*c* may be independently moved from the second bottom unit 132*d*. In contrast, the second bottom unit 132*d* may be independently moved from the first bottom unit 132*c*.

The first center touch unit 111*c* may be provided in the first bottom unit 132*c*, the second center touch unit 111*d* may be provided in the second bottom unit 132*d*, and the edge touch unit 112 may be provided the connection unit 133 of a recessed unit 130-4. The first center touch unit 111*c* and the second center touch unit 111*d* may be provided to be physically separated. Therefore, a touch pad of the first center touch unit 111*c* and a touch pad of the second center touch unit 111*d* may be independently provided.

The first center touch unit 111*c* and the second center touch unit 111*d* may be independently movable. For example, the first center touch unit 111*c* may employ a structure to be pressable and the second center touch unit 111*d* may employ a structure to be tiltable in four directions of up, down, left and right. In this case, a user may move a cursor of the display device by tilting the second center touch unit 111d by applying the pressure. In addition, the user may select a menu in which the cursor of the display device is placed by clicking the first center touch unit 111c by applying the pressure. The first center touch unit 111c and the second center touch unit 111d may include each movement different from each other. For example, the first center touch unit 111c may employ a structure to be tiltable and the second center touch unit 111d may employ a structure to be pressable.

In addition, none of the first center touch unit 111c and the second center touch unit 111d may employ a structure configured to be movable. In this case, the first center touch unit 111c and the second center touch unit 111d may be physically separated and thus the first center touch unit 111c and the second center touch unit 111d may be provided by each touch pad, respectively.

The first center touch unit 111c, the second center touch unit 111d, and the edge touch unit 112 may independently receive a touch signal. For an example, the first center touch unit 111c may receive a gesture touch signal, the second center touch unit 111d may receive a direction touch signal, and the edge touch unit 112 may receive a rolling or circling touch signal.

Figure 21:
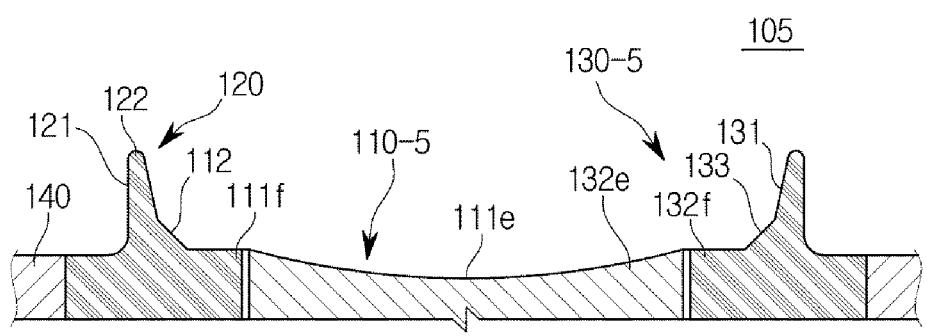
FIG. 21 is a cross-sectional view of a touch input device in accordance with a sixth embodiment of the present disclosure.

FIG. 21 is a cross-sectional view of a touch input device in accordance with a sixth embodiment of the present disclosure.

According to the sixth embodiment, a touch unit 110-5 of a touch input device 105 may include a first center touch unit 111e provided by a concave curved surface, a second center touch unit 111f configured to surround the first center touch unit 111e and provided by a flat surface, and an edge touch unit 112 configured to surround the second center touch unit 111f and provided by an inclined surface.

A bottom unit 132 may include a first bottom unit 132e placed in the center provided by a concave surface, and a second bottom unit 132f configured to surround the first bottom unit 132e and provided by a flat surface.

The first center touch unit 111e may be provided in the first bottom unit 132e, the second center touch unit 111f may be provided in the second bottom unit 132f, and the edge touch unit 112 may be provided the connection unit 133 of a recessed unit 130-3. The first center touch unit 111e and the second center touch unit 111f may be provided to be physically separated from each other. Therefore, a touch pad of the first center touch unit 111e and a touch pad of the second center touch unit 111f may be independently provided.

Figure 22:
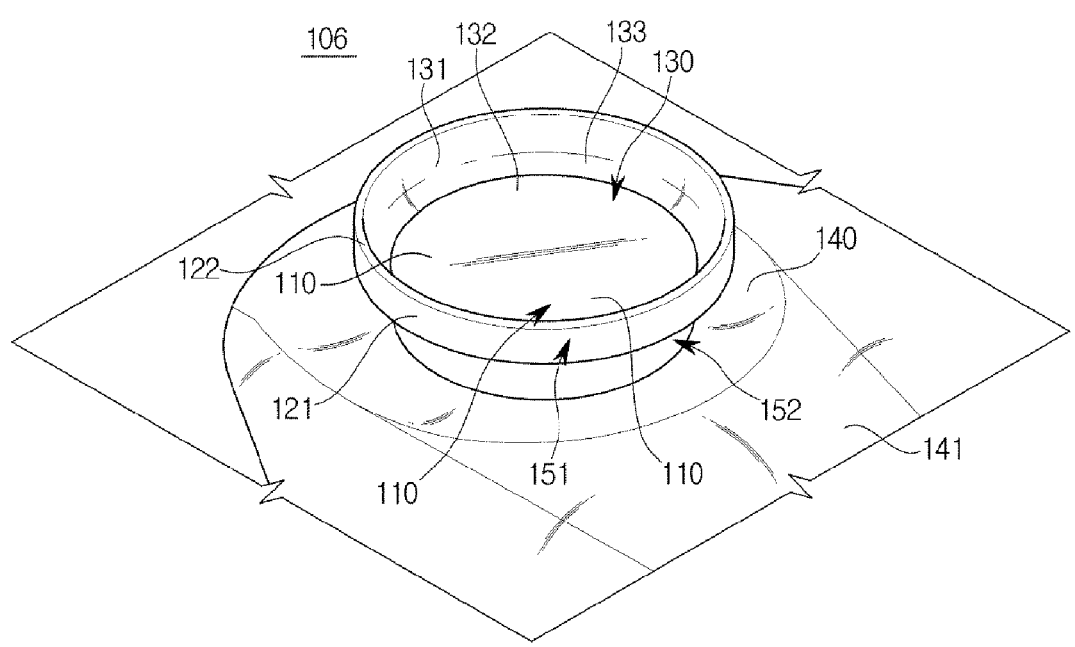
FIG. 22 is a perspective view of a touch input device in accordance with a seventh embodiment of the present disclosure.
Figure 23:
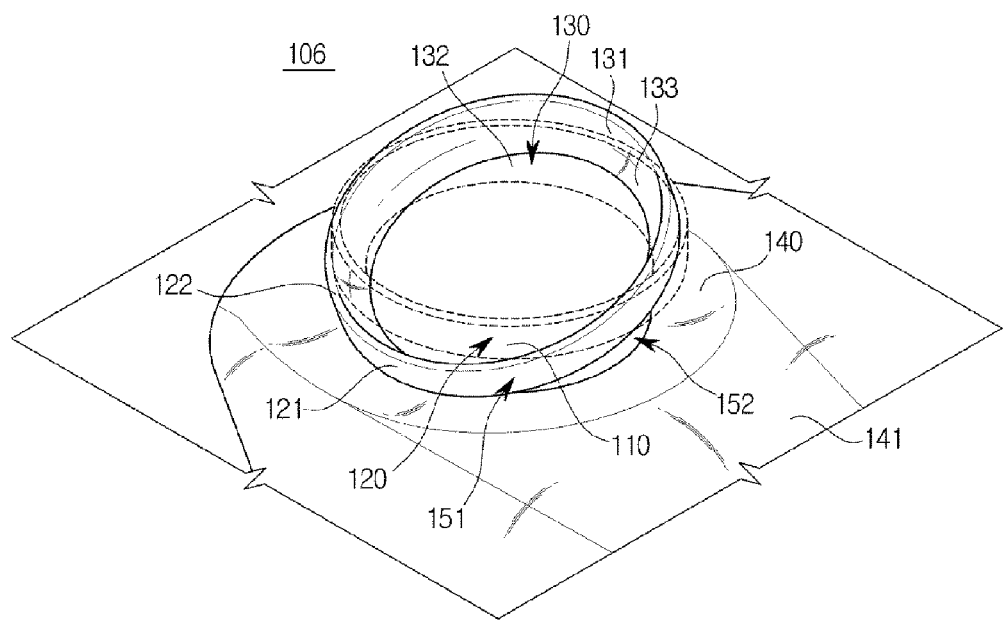
FIG. 23 is a perspective view illustrating an operation of a touch input device in accordance with a seventh embodiment of the present disclosure.

FIG. 22 is a perspective view of a touch input device in accordance with a seventh embodiment of the present disclosure and FIG. 23 is a perspective view illustrating an operation of a touch input device in accordance with a seventh embodiment of the present disclosure.

According to the seventh embodiment, a touch input device 106 may be provided to allow inclining or tilting. The touch input device 106 may be formed as a single structure including a protrusion unit 120 and a recessed unit 130 and may be provided to be tilting against a mounting surface 140. In addition, the touch input device 106 may be provided to allow a pressing gesture.

The touch input device 106 may include a body 151 including the protrusion unit 120 and the recessed unit 130, a supporting unit 152 supporting the body 151. The supporting unit 152 may be installed to support a lower portion of the body 151 and to be tilting against the mounting surface 140. However, a structure configured to allow tilting may be implemented by well-known technology and thus a detail drawing and description will be omitted in the present disclosure.

The touch input device 106 may be tilted in at least one direction with respect to a central axis thereof. The touch input device 106 may be tilted in four directions of front, back, left and right, but is not limited thereto. The touch input device 106 may be provided to be tilted in various directions according to embodiments. In addition, when pressing a central portion of the touch input device 106, the touch unit 110 may be pressed in a flat manner.

A user may input a pre-determined operation signal by pressing or tilting the touch input device 106 by applying the pressure. For example, the user may operate a selected menu by pressing the center portion of the touch input device 106, and the user may move a cursor upward by pressing the upper portion of the touch input device 106.

Similar to the first embodiment, the protrusion unit 120 of the touch input device 101, 102, 103, 104, 105, 106 according to the second embodiment to the seventh embodiment may be provided to allow a touch input. That is, the touch unit 110 may be provided in the protrusion unit 120. For an example, a user may input a touch signal by rotating the outer surface portion 121 of the protrusion 120 while holding or by dragging the pointer to a protrusion direction of the protrusion 120 or an opposite direction to the protrusion direction while holding the outer surface portion 121. Herein, since the protrusion unit 120 is fixed to the mounting surface 140, the protrusion unit 120 may be not physically rotated or moved, but the controller may recognize that a user's hand, which is one example of the pointer, is slipped while being contacted to the outer surface portion 121.

The input of the gesture in the protrusion direction or in the opposite direction to the protrusion direction of the protrusion unit 120 is the same shown in the touch input device 100 according to the first embodiment, and thus the description thereof will be omitted.

Although not shown in the drawings, a variety components related to the operation may be embedded in the touch input device 106. In the inside of the touch input device 106, the above-mentioned structure configured to be pressed or tilted in five directions may be included. However, those structures may be implemented by well-known technology and thus a detailed description will be omitted in the present disclosure.

Figure 24:
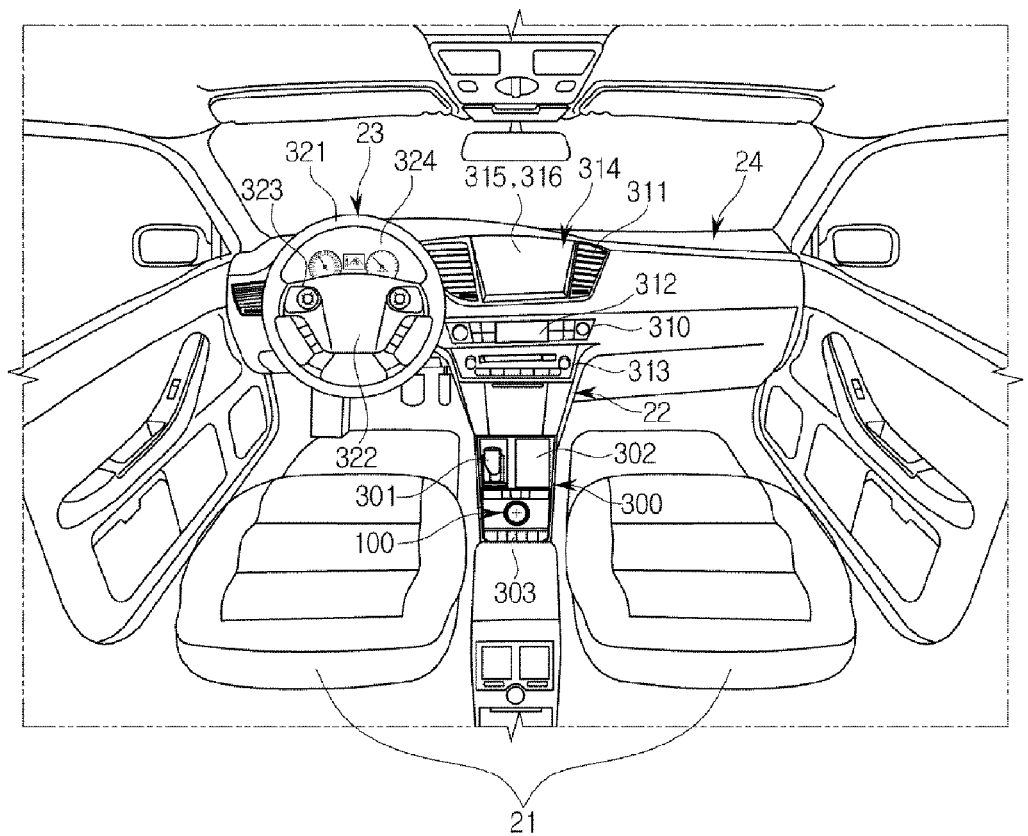
FIG. 24 is a view illustrating an interior of a vehicle, in which a touch input device in accordance with a first embodiment is installed.
Figure 25A:
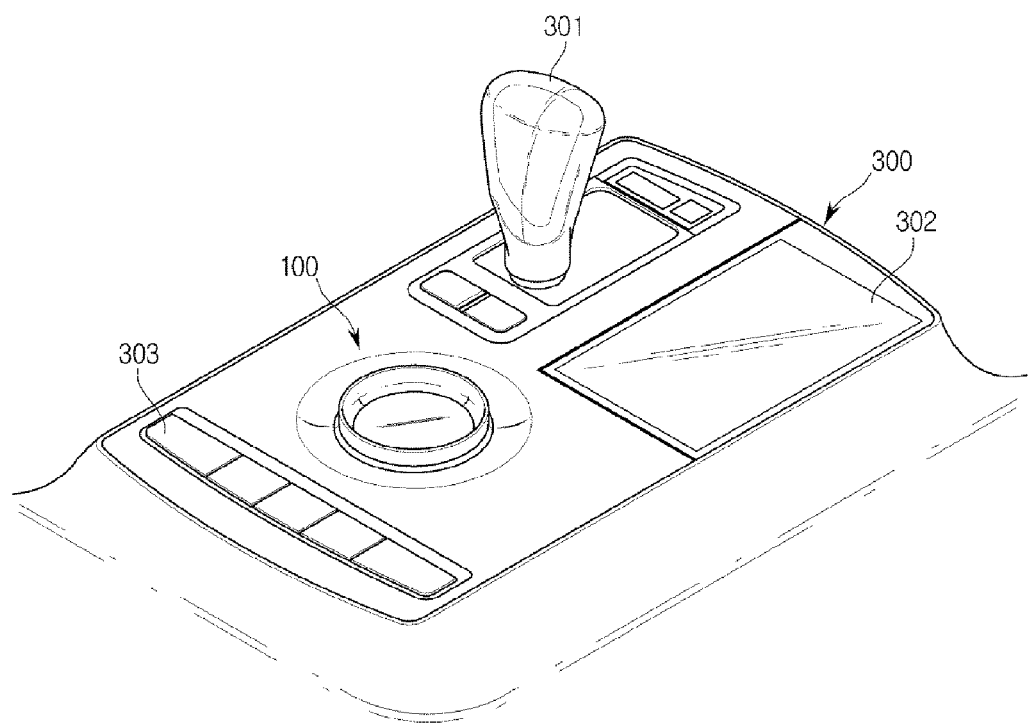
FIGS. 25A and 25B are perspective views illustrating a gearbox in which a touch input device is installed.
Figure 25B:
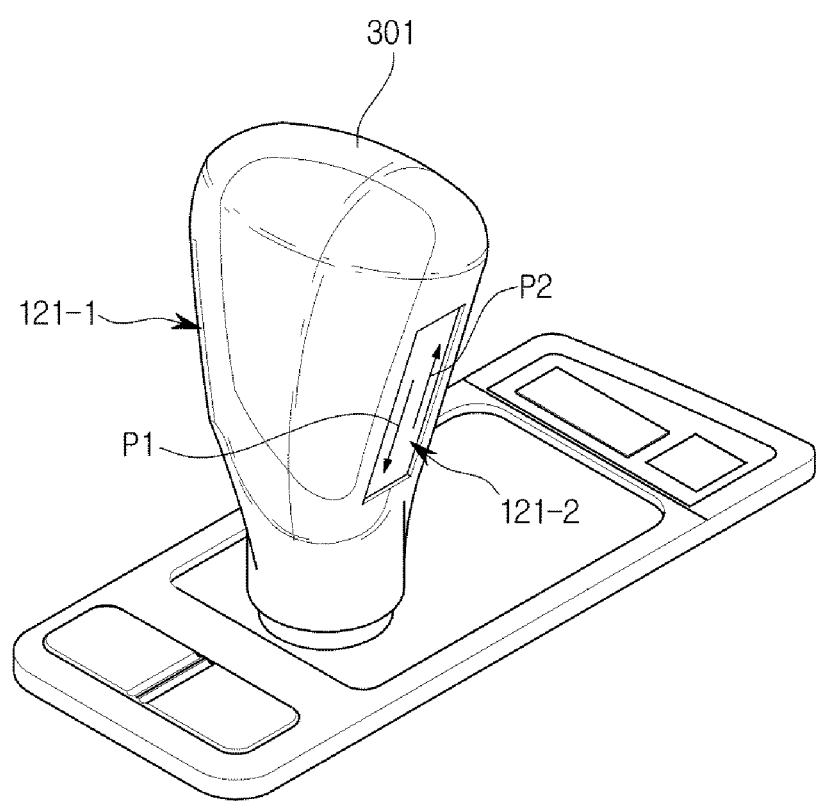

FIG. 24 is a view illustrating an interior of a vehicle, in which a touch input device in accordance with a first embodiment is installed and FIGS. 25A and 25B are perspective views illustrating a gearbox in which a touch input device is installed.

Hereinafter for convenience of the description, a case in which the touch input device 100 according to the first embodiment is installed in the gear box 300 is described, but the touch input device is not limited thereto. The touch input device 101, 102, 103, 104, 105, 106 according to the second embodiment to the seventh embodiment may be installed.

As shown in FIG. 24, the vehicle 20 may include a seat 21 on which a passenger is boarded, a gear box 300, a dashboard 24 provided with a center fascia 22 and a steering wheel 23.

An air conditioning device 310, a clock 312, an audio device 313 and an AVN device 314 may be installed in the center fascia 22.

The air conditioning device 310 may keep an air inside the vehicle 20 in fresh by controlling a temperature, a moisture, an air cleanliness, and a flow of air of the inside of the vehicle 20. The air conditioning device 310 may be installed in the center fascia 22 and may include at least one discharging port 311 discharging air. A button or a dial may be installed in the center fascia 22 to control the air conditioning device 310. A user, such as a driver, may control the air conditioning device 310 by using a button disposed on the center fascia 22.

The clock 312 may be provided adjacent to a button or a dial which are configured to control the air conditioning device 310.

The audio device 313 may include an operation panel in which a number of buttons are provided to perform functions of the audio device 313. The audio device 313 may provide a radio mode configure to provide a radio function, and a media mode configured to play an audio file of various storage media in which the audio file is stored.

The AVN device 314 may be embedded inside the center fascia 22 of the vehicle 20 or may be protruded on the dashboard 24. The AVN device 314 may be a device configured to integrally operate an audio function, a video function, and a navigation function according to an operation by a user. The AVN device 314 may include an input unit 315 configured to receive an input of a command about the AVN device 314 from a user, and a display unit 316 configured to display a screen related to an audio function, a screen related to a video function, and a screen related to a navigation function. However, the audio device 313 may be omitted when the AVN device 314 is overlapped therewith.

The steering wheel 23 may be a device configured to adjust a driving direction of the vehicle 20, and may include a rim 321 held by the driver and a spoke 322 connected to a steering system of the vehicle 20 and configured to connect the rim 321 to a hub of a rotation shaft for the steering. According to embodiments, a manipulation device 323 may be formed in the spoke 322 to control various devices, such as an audio device, inside the vehicle 20.

The dashboard 24 may further include various gauge boards 324 informing a variety of information, e.g., driving speed, mileage, engine speed, lubrication quantity, cooling water temperature and a variety of warnings, to a driver during driving the vehicle, and a globe box 325 in which various things are stored.

In general, the gear box 300 may be installed between a driver seat and a passenger seat in the vehicle 20, and operation devices needed to be operated while a driver drives the vehicle 20 may be mounted to the gear box 300.

Referring to FIGS. 25A and 25B, in the gear box 300, a gear lever 301 configured to change a speed of the vehicle 20, a display unit 302 configured to control performing functions of the vehicle 20, and a button 303 configured to operate a variety of devices of the vehicle 20 may be installed. The touch input device 100 according to the first embodiment may be installed in the gear box 300.

As shown in FIG. 25A, the touch input device 100 may be installed in the gear box 300 to allow a driver to operate the touch input device 100 while a driver watches the front during driving. For example the touch input unit 100 may be installed on a lower portion of the gear lever 301. Alternatively, the touch input device 100 may be installed in the center fascia 22, a passenger seat, or a rear seat.

Meanwhile, the above-described touch input device according to the first embodiment may be provided in the vehicle as a separate unit as illustrated in FIG. 25A, but is not limited thereto. The touch input device may be implemented by a variety of devices having a protruding shape in the vehicle.

As shown in FIG. 25B, the touch input device according to another embodiment may be integrally formed with the gear lever 301 so that a driver is allowed to operate the touch input device while a driver watches the front during driving.

A touch input device integrally formed with the gear lever 301 may be provided in a way that an outer surface portion 121-1 and 121-2 thereof is installed in at least one lateral surface or front surface of the gear lever 301, and thus the touch input device may receive a touch signal in an opposite direction P1 to a protrusion direction or in the protrusion direction P2 of the gear lever 301. For example, the touch input device integrally formed with the gear lever 301 may include the outer surface portion 121-1 and 121-2 formed on both of right side and left side.

In this case, when an outer surface portion 121-1 formed in the left side receives a gesture in the opposite direction P1 to the protrusion direction of the gear lever 301 from a user, and also when an outer surface portion 121-2 formed in the right side receives a gesture in the opposite direction P1 to the protrusion direction of the gear lever 301 from a user, a controller of the touch input device may determine that a user's intension is to input a gesture in the opposite direction P1 to the protrusion direction. In addition, when the outer surface portion 121-1 formed in the left side receives a gesture in the protrusion direction P2 of the gear lever 301 from a user, and also when the outer surface portion 121-2 formed in the right side receives a gesture in the protrusion direction P2 of the gear lever 301 from a user, the controller of the touch input device may determine that a user's intension is to input a gesture in the protrusion direction P2 to the protrusion direction.

When the outer surface portion 121-1 formed in the left side receives a gesture in the opposite direction P1 to the protrusion direction of the gear lever 301 from a user, and also when the outer surface portion 121-2 formed in the right side receives a gesture in the protrusion direction P2 of the gear lever 301 from a user, the controller of the touch input device may determine that any touch input signal is not input.

In addition, when the outer surface portion 121-1 formed in the left side receives a gesture in the protrusion direction P2 of the gear lever 301 from a user, and also when the outer surface portion 121-2 formed in the right side receives a gesture in the opposite direction P1 of the protrusion direction of the gear lever 301 from a user, the controller of the touch input device may determine that any touch input signal is not input.

For example, when the controller determines that a touch signal is input in the opposite direction P1 to the protrusion direction of the gear lever 301, the controller may operate a parking brake of the vehicle 20, and when the controller determines that a touch signal is input in the protrusion direction P2 of the gear lever 301, the controller may release the parking brake of the vehicle 20

The touch input device having the protruding shape may be provided in the above-mentioned gear lever 301, but is not limited thereto.

Referring to FIG. 24 again, the touch input device 100 may be connected to the display device inside the vehicle 20 to select or to operate a variety of icons displayed on the display device.

The display device installed in the vehicle 20 may be the audio device 313, the AVN device 314 or the gauge boards 324. As needed, the display unit 302 may be installed in the gear box 300. In addition, the display device may be connected to Head Up Display (HUD) device or a back mirror.

For example, the touch input device 100 may move a cursor displayed on the display device or operate an icon. The icon may include a main menu, a selection menu, and a setting menu. In addition, through the touch input device 100, a navigator may be operated, operation condition of the vehicle may be set, and peripheral devices of the vehicle may be operated.

The display device of the vehicle 20 may be the above-mentioned display device related to the touch input device 100 according to the first embodiment.

As is apparent from the above description, according to the proposed touch input device, a vehicle including the touch input device, and a method for controlling the touch input device, a user may perform control operation of a variety devices in a short time by an input in a protrusion direction of the touch input device or in an opposite direction to the protrusion direction without watching the touch input device.

By using the touch input device, a vehicle including the touch input device, and a method for controlling the touch input device, when operating a navigator or an audio device while driving, a user may instantly perform control operation of a variety devices by an input in a protrusion direction of the touch input device or in an opposite direction to the protrusion direction by recognizing the protruding shape of the touch input device while watching the front.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A touch input device comprising:
a protrusion unit that protrudes from a mounting surface, includes an outer side surface portion provided on an outer side surface of the protrusion unit, and is configured to receive a touch input; and
a recessed unit formed inside the protrusion unit,
wherein the outer side surface portion is configured to receive a touch input in a protrusion direction of the protrusion unit and in an opposite direction to the protrusion direction of the protrusion unit.

2. The touch input device of claim 1, wherein:
the protrusion unit is formed in a cylindrical-like shape or a truncated cone-like shape.

3. The touch input device of claim 1, further comprising:
a controller configured recognize a touch input signal received at the outer side surface portion, analyze the recognized touch input signal, and provide a command to another device based on the analyzed touch input signal.

4. The touch input device of claim 3, wherein:
the controller is further configured to turn on a display device when a gesture is input in the opposite direction and turn off the display device when a gesture is input in the protrusion direction.

5. The touch input device of claim 4, wherein:
the controller is further configured to control the display device so that the display device outputs a pre-determined screen when a gesture is input in the opposite direction.

6. The touch input device of claim 4, wherein the controller is further configured to control the display device so that the display device outputs a pre-determined screen when a gesture is input in the protrusion direction.

7. The touch input device of claim 4, wherein the controller is further configured to zoom in on a screen output by the display device when a gesture is input in the opposite direction and zoom out from the screen output by the display device when a gesture is input in the protrusion direction.

8. The touch input device of claim 1, wherein:
the outer side surface portion is further configured to receive multi-touch input.

9. The touch input device of claim 1, further comprising:
a controller configured to recognize a multi-touch input signal received at the outer side surface portion, analyze the recognized multi-touch input signal, and provide a command to another device based on the analyzed multi-touch input signal.

10. The touch input device of claim 1, wherein:
the outer side surface portion is formed by an inclined surface or a curved surface having a negative curvature.

11. A vehicle comprising:
a touch input device including:
a protrusion unit that protrudes from a mounting surface, includes an outer side surface portion provided on an outer side surface of the protrusion unit, and is configured to receive a touch input, and
a recessed unit formed inside the protrusion unit,
wherein the outer side surface portion is configured to receive a touch input in a protrusion direction of the protrusion unit and in an opposite direction to the protrusion direction of the protrusion unit.

12. The vehicle of claim 11, further comprising:
a display device that is operated by a touch input signal received at the touch input device.

13. The vehicle of claim 12, wherein:
the display device is turned on when a gesture is input in the opposite direction and is turned off when a gesture is input in the protrusion direction.

14. The vehicle of claim 12, wherein:
the display device outputs a pre-determined screen when a gesture is input in the opposite direction.

15. The vehicle of claim 12, wherein:
the display device outputs a pre-determined screen when a gesture is input in the protrusion direction.

16. The vehicle of claim 12, wherein:
the display device zooms in on a screen when a gesture is input in the opposite direction and zooms out from the screen when a gesture is input in the protrusion direction.

17. The vehicle of claim 11, wherein:
the touch input device is installed between a driver seat and a passenger seat of the vehicle.

18. The vehicle of claim 11, further comprising:
a controller configured to operate a parking brake based on an inputted gesture in the protrusion direction or in the opposite direction.

19. The vehicle of claim 11, wherein:
the outer side surface portion receives multi-touch input.

20. The vehicle of claim 11, wherein:
the outer side surface portion is formed by an inclined surface or a curved surface having a negative curvature.

21. A touch input device comprising:
a mounting surface; and
a protrusion unit that protrudes from a mounting surface, includes an outer side surface portion provided on an outer side surface of the protrusion unit, and is configured to receive a touch input,
wherein the outer side surface portion is configured to receive a touch input in a protrusion direction of the protrusion unit and in an opposite direction to the protrusion direction of the protrusion unit.

22. A method for controlling a touch input device including a protrusion unit that protrudes from a mounting surface, includes an outer side surface portion provided on an outer side surface of the protrusion unit, and is configured to receive a touch input, the method comprising:
receiving, at the outer side surface portion of the protrusion unit, a touch input signal in a protrusion direction of the protrusion unit or in an opposite direction to the protrusion direction of the protrusion unit;
displaying a first pre-determined screen when a gesture is input in the opposite direction; and
displaying a second pre-determined screen when a gesture is input in the protrusion direction.

23. The method of claim 22, wherein:
the first pre-determined screen or the second pre-determined screen includes a turned-off screen.

24. The method of claim 22, wherein:
the first pre-determined screen includes a zoomed-in screen of a previously displayed screen, and
the second pre-determined screen includes a zoomed-out screen of the previously displayed screen.

25. The method of claim 22, further comprising:
receiving, at the outer side surface portion of the protrusion unit, a multi-touch input signal.

* * * * *